United States Patent
Hirano

(10) Patent No.: US 7,751,413 B2
(45) Date of Patent: Jul. 6, 2010

(54) COMMUNICATION SYSTEM AND COMMUNICATION NODE

(75) Inventor: Jun Hirano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 11/815,305

(22) PCT Filed: Feb. 1, 2006

(86) PCT No.: PCT/JP2006/301656

§ 371 (c)(1),
(2), (4) Date: Nov. 20, 2007

(87) PCT Pub. No.: WO2006/082847

PCT Pub. Date: Aug. 10, 2006

(65) Prior Publication Data

US 2009/0022161 A1  Jan. 22, 2009

(30) Foreign Application Priority Data

Feb. 4, 2005 (JP) .............................. 2005-029584

(51) Int. Cl.
*H04L 12/28* (2006.01)
*H04L 12/56* (2006.01)
*G06F 15/16* (2006.01)
*G06F 15/173* (2006.01)

(52) U.S. Cl. ...................... 370/400; 370/389; 709/232; 709/238

(58) Field of Classification Search .................. 370/389, 370/400; 709/232, 238
See application file for complete search history.

(56) References Cited

U.S. PATENT DOCUMENTS

2003/0118051 A1\* 6/2003 Ooms ......................... 370/471
2004/0081098 A1   4/2004 Sakai (Continued)

FOREIGN PATENT DOCUMENTS

JP   2004 104544   4/2004

OTHER PUBLICATIONS

PCT International Search Report dated Mar. 20, 2006.

(Continued)

*Primary Examiner*—Ronald Abelson
(74) *Attorney, Agent, or Firm*—Dickinson Wright PLLC

(57) ABSTRACT

A technique is disclosed, by which it is possible to identify a communication node having special function under the condition that a certain communication node knows only the address of a communication node having no special function. According to this technique, a first communication node 10 having a first function (e.g. the mounting of IPv6 and ICMPv6) and a second function (e.g. the mounting of NSIS) transmits a search packet by an echo request packet of ICMPv6 with the purpose of searching a communication node having the first function and the second function to a second communication node 20 having only the first function. The second communication node sends back a response packet to this by an echo response packet of ICMPv6. A communication node 15 having the first function and the second function and being the first receiver of this response packet grasps that own communication node is the search object of the first communication node. Also, by the search packet, desired information can be offered from the first communication node to the communication node of the search object.

21 Claims, 22 Drawing Sheets

U.S. PATENT DOCUMENTS

2005/0108425 A1* 5/2005 Rabinovitch ............... 709/238

OTHER PUBLICATIONS

S. Lee et al.; Mobility Functions in the QoS-NSLP, draft-lee-nsis-mobility-nslp-00.txt, Oct. 20, 2003.

Takato Mita et al.; "Mobility o Support shita Seamless na QoS Keiro Kakuritsu Hoho ni Kansuru Teian," Information Processing Society of Japan Kenkyu Hokoku, vol. 20045, No. 44, May 14, 2004, pp. 129-134.

S. Deering, et al. "Internet Protocol, Version 6 (IPv6) Specification," Network Working Group, Dec. 1998, pp. 1-39.

D. Johnson, et al. "Mobility Support in IPv6," IETF Mobile IP Working Group, Internet Draft: draft-ietf-mobileip-ipv6-24.txt, Jun. 30, 2003, pp. 1-172.

R. Koodii (editor), "Fast Handovers for Mobile IPv6," Mipshop Working Group, Internet Draft: draft-ietf-mipshop-fast-mipv6-03.txt, Oct. 25, 2004, pp. 1-42.

R. Braden, et al. "Resource Reservation Protocol (RSVP)—Version 1 Functional Specification," Network Working Group, Sep. 1997, pp. 1-112.

J. Loughney, chair, "Next Steps in Signaling (nsis)," http://www.ietf.org/html.charters/nsis-charter.html, Nov. 26, 2004, pp. 1-3.

H. Chaskar (editor), "requirements of a Quality of Service (QoS) Solution for Mobile IP," Network Working Group, Sep. 2003, pp. 1-10.

S. Van den Bosch, et al. "NSLP for Quality-of-Service Signaling," Next Steps in Signaling, Internet Draft: draft-ietf-nsis-qos-nslp-05.txt, Oct. 25, 2004, pp. 1-80.

X. Fu, et al. "Mobility Issues in Next Steps in Signaling (NSIS)," Network Working Group, Internet Draft: draft-fu-nsis-mobility-01.txt, Oct. 17, 2003, pp. 1-31.

S. Lee, et al. "Applicability Statement of NSIS Protocols in Mobile Environments," IETF Next Steps in Signaling, Internet Draft: draft-ietf-nsis-applicability-mobility-signaling-00.txt, Oct. 18, 2004, pp. 1-51.

R. Hancock, et al. "Next Steps in Signaling: Framework," Next Steps in Signaling, Internet Draft: draft-ietf-nsis-fw-07, Nov. 1, 2004, pp. 1-53.

C. Partridge, et al. "IPv6 Router Alert Option," Network Working Group, Oct. 1999, pp. 1-6.

A. Conta, et al. "Internet conrol Message Protocol (ICMPv6) for the Internet Protocol Version 6 (IPv6) Specification," Network Working Group, Dec. 1998, pp. 1-18.

* cited by examiner

FIG. 16

| IPv6 HEADER pnQNE → nAR | HOP-HOP HEADER RAO NSIS QoS | ICMP PDU ECHO REQUEST | TYPE nnQNE SEARCH | SESSION IDENTIFIER session-X | FLOW IDENTIFIER flow-X | INFORMATION INFORMATION ON ADDRESS OF pnQNE, QUERY AND QoS LEVEL |

US 7,751,413 B2

COMMUNICATION SYSTEM AND COMMUNICATION NODE

TECHNICAL FIELD

The present invention relates to a communication system and a communication node for performing packet communication by using IPv6 (Internet Protocol version 6). In particular, the invention relates to a communication system and a communication node for setting a path used by a mobile node (e.g. QoS (Quality of Service) path) during handover of a mobile node (MN), which performs radio communication using mobile IPv6 (MIPv6: Mobile Internet Protocol version 6), which is the next generation Internet Protocol.

BACKGROUND ART

Mobile IPv6

A technique is known, which can provide connection of communication network seamlessly even when a mobile node is moving, to a user, who wants to have access to a communication network such as Internet from the mobile node via radio network. This technique uses mobile IPv6, which is the next generation Internet protocol by extending IPv6 (see the Patent Document 1 given below). In a radio communication system using mobile IPv6, even when MN (mobile node) performs handover from a certain subnet to another subnet, it is so arranged that the communication of MN can be continued by using CoA (Care of Address) suitable for the new subnet. The technique of mobile IPv6 is disclosed, for instance, in the Non-Patent Document 2 as given below.

(FMIPv6)

In the mobile IPv6 as given above, communication of MN performing the handover between the subnets may be temporarily interrupted due to the influence from the handover. As a technique to achieve high-speed handover by reducing the interruption of the communication caused by the handover, Fast Handovers for Mobile IPv6 (FMIPv6) is known, which is disclosed in the Non-Patent Document 3 as given below.

FMIPv6 is a technique to carry out the processing in early stage, which is performed after the handover in MIPv6 when MN starts the processing relating to the moving in advance (before the handover). For instance, before MN changes link connection to a new subnet, MN performs the processing such as the acquisition of CoA usable at the new subnet (NCoA (New Care of Address)) in advance by acquiring L2 information (e.g. MAC (Media Access Control) address) of AP (Access Point), which belongs to the new subnet.

(RSVP and NSIS QoS)

On the other hand, in the communication using network, there are services such as QoS guarantee (such services are referred as additional services in the present specification), and there are various types of communication protocols to provide such additional services. Among these various types of communication protocols, RSVP (Resource Reservation Protocol) is known as a protocol to guarantee QoS (e.g. see the Non-Patent Document 4 as given below). RSVP ensures smooth transmission of data from a transmitting side communication node to a receiving side communication node by performing band reservation on a path (flow) from the transmitting side communication node to the receiving side communication node.

With regard to MN, which performs the handover between subnets, there are demands that the additional services such as QoS guarantee, which have been received before the handover, should be continuously received even after the handover. In RSVP as described above, it is particularly difficult to change QoS path in association with the moving of MN. Also, in case QoS paths may be partially overlapped before and after the handover, double reservation may occur on the overlapped portion. Thus, it does not properly fit to the moving of MN.

To solve the problems of RSVP as described above, discussions are currently going on for the standardization of a new protocol called NSIS (New Step in Signaling) in IETF (Internet Engineering Task Force) (see the Non-Patent Document 5 given below). Expectation is now put on NSIS because it appears to be very effective for various types of additional services such as QoS guarantee in mobile environment, and there are the references, in which the requirements and the methods to realize QoS guarantee or mobility support in NSIS are described (e.g. see the Non-Patent Documents 6-10 given below). Description will be given below on general outline of NSIS, which is currently a draft specification in NSIS Working Group of IETF, and also on the method to establish QoS path.

FIG. 21 shows protocol stacks of NSIS and lower layer to explain protocol arrangement of NSIS in the prior art. The NSIS protocol layer is at the position immediately above IP and lower layer. Further, the NSIS protocol layer consists of two layers: NSLP (NSIS Signaling Layer Protocol), which is the protocol to generate and perform processing of signaling message to provide additional services, and NTLP (NSIS Transport Layer Protocol), which carries out the routing of signaling message of NSLP. There are various types of NSLPs: NSLP for QoS (QoS NSLP) and NSLP for other additional services (service A and service B) (i.e. NSLP of service A and NSLP of service B).

FIG. 22 is a schematical drawing to explain the concept of "adjacence" of NE (NSIS Entity), which is a node of NSIS in the prior art, and QNE (QoS NSIS Entity) in the prior art. As shown in FIG. 22, all nodes (NEs) mounted with NSIS function are mounted at least with NTLP. Above the NTLP, NSLP may not necessarily be present, or more than one NSLP may be present. Here, NE mounted with NSLP for QoS is referred as QNE. What can be NE is a terminal or a router. Also, there may be a plurality of routers between the neighboring NEs. A router, which is not NE, and an NE, which does not have NSLP, may be present between the adjacent QNEs (neighbor QNEs).

NSIS covers various functions not only in mobile environment but also in ordinary static network. In the present specification, special notice is given on the function to establish the additional services backed by mobility support, which is one of the functions of NSIS, and it is assumed that additional services backed by mobility support are established by the mounting of NSIS. In particular, among the additional services backed by mobility support, the function to achieve QoS guarantee is referred as NSIS QOS in the present specification.

(RAO)

A technique relating to RAO (Router Alert Option) of IPv6 is described in the Non-Patent Document 11 as given below. This RAO is a type of hop-by-hop option of IPv6 (see the Non-Patent Document 1 given below) to give alert to the transfer router of the packet to perform detailed processing on the content of the packet. A communication node (router) to transfer a packet having RAO must check the data contained in the interior of the packet in detail when the presence of RAO is detected. Therefore, RAO is useful under the condition where a communication node on a path for transfer contains information to require special processing. When the communication node to transfer a packet having RAO interprets the content of the packet and it is found that there is no need to perform the processing, the packet is normally transferred without changing it.

(ICMPv6)

In the Non-Patent Document 12 as given below, a technique relating to ICMPv6 (Internet Control Message Protocol for the Internet Protocol Version 6) is described, which is recommended to be integrally mounted in IPv6 to achieve the control in IP such as notification of error, which occurs during the processing of the packet. ICMPv6 message is roughly divided to error message and information message. Error messages are the messages to notify errors such as non-arrival at the destination, the excess in packet size, the excess in hop-by-hop option number, parameter abnormality, etc. Information messages are the messages to perform echo request, echo response, router demand, router notification, etc.

Non-Patent Document 1: S. Deering and R. Hinden., "Internet Protocol, Version 6 (IPv6) Specification", RFC2460, December 1998.

Non-Patent Document 2: Johnson, D. B., Perkins, C. E., and Arkko, J., "Mobility Support in IPv6", Internet Draft: draft-ietf-mobileip-ipv6-24.txt, Work In Progress, June 2003.

Non-Patent Document 3: Rajeev Koodli (Editor), "Fast Handovers for Mobile IPv6", draft-ietf-mipshop-fast-mipv6-03.txt, Oct. 25, 2004

Non-Patent Document 4: R. Braden, L. Zhang, S. Berson, S. Herzog and S. Jamin, "Resource ReSerVation Protocol—Version 1 Functional Specification", RFC 2205, September 1997.

Non-Patent Document 5: NSIS WG (http://www.ietf.org/html.charters/nsis-charter.html)

Non-Patent Document 6: H. Chaskar, Ed, "Requirements of a Quality of Service (QoS) Solution for Mobile IP", RFC3583, September 2003

Non-Patent Document 7: Sven Van den Bosch, Georgios Karagiannis and Andrew McDonald "NSLP for Quality-of-Service signalling", draft-ietf-nsis-qos-nslp-05.txt, October 2004

Non-Patent Document 8: X. Fu, H. Schulzrinne, H. T schofenig, "Mobility issues in Next Step signaling", draft-funsis-mobility-01.txt, October 2003

Non-Patent Document 9: S. Lee, et. Al., "Applicability Statement of NSIS Protocols in Mobile Environments", draft-ietf-nsis-applicability-mobility-signaling-00.txt, Oct. 18, 2004

Non-Patent Document 10: R. Hancock (editor), "Next Steps in Signaling: Framework", draft-ietf-nsis-fw-07.txt, Nov. 1, 2003

Non-Patent Document 11: C. Partridge and A. Jacks on, "IPv6 Router Alert Option", RFC2711, October 1999.

Non-Patent Document 12: A. Conta and S. Deering, "Internet Control Message Protocol (ICMPv6) for the Internet Protocol Version 6 (IPv6) Specification", RFC2463, December 1998.

Description will be given below on the problems to be solved by the present invention referring to FIG. 23 and FIG. 24.

FIG. 23 is a schematical drawing to show positional relationship and status of communication node to explain the problems to be solved by the present invention. It is supposed here that a communication node A wants, under the condition that it knows only the address of a communication node B, to identify a communication node (e.g. (communication node C), which is present in the vicinity of the communication B and has special function, and wants to supply desired information to the communication node or wants to know address of the communication node.

In case the communication node B is not provided with a function to identify a communication node having special function as desired by the communication node A under the above condition, it is difficult to identify the communication node C having special function by using conventional technique.

As described above, under the condition that the communication node A knows only the address of the communication node B having no special function, the identification of the communication node C is useful to identify a partner (a correspondent node by a protocol to fulfill special function) to replace the communication node B.

Concrete description will be given below on an example of the problem to be solved by the present invention. A plurality of communication nodes, which constitute a network, may have the possibility to have functions different from each other. Each communication node realizes various functions depending on the types of the protocol, with which it is mounted. For instance, the most basic function of the communication node of IP network is realized by the mounting of IPv4/v6 and ICMPv6. Specifically, in IP network, all communication nodes are basically mounted with IPv6 and ICMPv6, for instance.

On the other hand, by the mounting of other protocols, each communication node has special function (additional function) in addition to the function to be realized by IPv6 and ICMPv6. One of such functions is NSIS QoS function as described above, for instance.

FIG. 24 is a drawing to show a concrete example to explain the problems to be solved by the present invention. In FIG. 24, MN is going to perform handover from the subnet of pAR (previous Access Router) to nAR (new Access Router) while continuing the communication with CN (Correspondent Node). Between MN and CN before the handover, QoS path (path 124: flow identifier X and session identifier Y) is established. The QoS path is updated at the time of handover, and a new QoS path (path 134: flow identifier Z and session identifier Y) is established between MN and CN after the handover.

By the updating of QoS path at the time of handover, there is possibility that loss or delay of packet may occur due to the interruption of QoS guarantee. As a method to suppress the packet loss or delay to the minimum and to achieve smooth handover, a method is known, by which the updating of QoS path is started before the handover of MN. More concretely, a proxy to serve function as MN itself or on behalf of MN grasps address or the like of nAR at the next handover destination. By starting the updating at earlier stage of QoS path between nAR and CN before the handover of MN and by generating QoS path between MN and nAR after MN performed handover, QoS path can be quickly established.

It is anticipated that MN can acquire address of nAR in relatively easier manner. However, nAR is not necessarily mounted with NSIS QoS function, and there may be cases where only IPv6 and ICMPv6, which are the most basic functions for nAR, may be mounted. In such cases, MN can quickly establish QoS path by identifying QNE, which is present in the vicinity of nAR, and also by specifying this QNE as proxy and by requesting the starting of earlier updating of QoS path.

However, as explained by referring to FIG. 23, it is not possible to identify QNE, which is present in the vicinity of nAR (corresponding to the communication node C in FIG. 23), under the condition that MN (corresponding to the communication node A in FIG. 23) knows only the address of nAR (corresponding to the communication node B in FIG. 23). Specifically, it is not possible for MN to request the starting of earlier updating of QoS path to QNE, which is present in the vicinity of nAR.

DISCLOSURE OF THE INVENTION

To solve the above problems, it is an object of the present invention to provide a technique, by which it is possible for a certain communication node to identify a communication node having special function under the condition that it knows only the address of a communication node having no special function. In particular, it is another object of the invention to make it possible that QNE present in the vicinity of nAR can be identified under the condition that a movable MN knows only the address of nAR at the next handover destination and a request to start earlier updating of QoS path can be requested from MN to this QNE.

To attain the above object, the present invention provides a communication system comprising at least a first communication node, having a first function to realize transfer of a packet and a second function, being an additional function different from said first function, and a second communication node having said first function, and said first communication node grasps address of said second communication node, wherein:

said first communication node transmits a search packet to said second communication node for the purpose of searching a communication node having said first function and said second function;

said second communication node transmits a response packet including said predetermined information in response to the receiving of said search packet; and a third communication node, having said first function and said second function and being a first receiver of said response packet, grasps that it is a search object of said first communication node upon receipt of said response packet.

With the arrangement as described above, a certain communication node (a first communication node) can identify a communication node having special function (a third communication node) under the condition that a certain communication node (the first communication node) knows only the address of a communication node having no special function (a second communication node).

Also, the present invention provides the communication system with the above arrangement, wherein said search packet is transferred without modifying the packet from said first communication node to said second communication node, and after said second communication has received said search packet transmitted from said first communication node as it is, it is arranged that said response packet is transmitted, which has source address of said search packet as destination address.

With the arrangement as described above, the first communication node can identify the third communication node having special function under the condition that the first communication node knows only the address of the second communication node, which has no special function.

Further, the present invention provides the communication system with the above arrangement, wherein said third communication node discards said response packet and generates and transmits a notifying packet including address of said third communication node to said destination address of said response packet.

With the arrangement as described above, the address of the third communication node can be notified to the first communication node by a notifying packet.

Also, the present invention provides the communication system with the above arrangement, wherein said third communication node inserts address of said third communication node into said response packet and transmits said response packet.

With the arrangement as described above, the address of the third communication node can be notified to the first communication node by a response packet.

Further, the present invention provides the communication system with the above arrangement, wherein the communication node having said first function and said second function to transfer said response packet transfers the response packet as it is without modifying the packet when said response packet with the address of said third communication node inserted therein is received.

With the arrangement as described above, the address of a communication node having the first function and the second function can be notified to the first communication node, being the first receiver of the response packet, by the response packet.

Also, the present invention provides the communication system with the above arrangement, wherein the communication node having said first function and said second function, which transfers said search packet from said first communication node to said second communication node, is arranged to transfer by rewriting source address of said search packet to address of own communication node, said second communication node has address of said communication node, having said first function and said second function as rewritten immediately before reaching said second communication node, as a source address, and after said search packet having address of said first communication node in a predetermined region has been received, the source address of said search packet is transmitted, which has source address of said search packet as destination address.

With the arrangement as described above, a communication node identified by source address of the search packet, which reaches the second communication node, can be turned to the search object of the first communication node.

Further, the present invention provides the communication system with the above arrangement, wherein said third communication node has the address of said first communication node included in said response packet as destination address, and generates and transmits a notifying packet including address of said third communication node.

With the arrangement as described above, the address of the third communication node can be notified to the first communication node by a notifying packet.

Also, the present invention provides the communication system with the above arrangement, wherein said first communication node inserts desired information into payload of said search packet, and said second communication node includes said desired information in the payload of said search packet into the payload of said response packet without changing so that said desired information is offered from said first communication node transmitting said search packet to said third communication node, which receives said response packet.

With the arrangement as described above, desired information of the first communication node can be provided from the first communication node to the third communication node, which is the search object.

Further, the present invention provides the communication system with the above arrangement, wherein a movable mobile node transmits a search request of a communication node having said first function and said second function including at least the address of said second communication node to said first communication node, and said first communication node generates and transmits said search packet upon receipt of said search request.

With the arrangement as described above, the mobile node can search a communication node mounted with a desired function using the first communication node as proxy.

Also, the present invention provides the communication system with the above arrangement, wherein said first function is realized by the mounting of IPv6 and ICMPv6, and said search packet and said response packet are an echo request packet and an echo response packet of ICMPv6 respectively.

With the arrangement as described above, the second communication node can transmit an echo response packet including the content of an echo request packet as it is to source address of the echo request packet of ICMPv6.

Further, the present invention provides the communication system with the above arrangement, wherein said second function is realized by the mounting of NSIS, and a communication node mounted with NSIS and being the first receiver of said response packet to be transmitted from said second communication node is searched by said first communication node.

With the arrangement as described above, the first communication node can identify the third communication node having NSIS QoS function and being present in the vicinity of the second communication node, for instance, and can start earlier updating of QoS path.

Also, to attain the above object, the present invention provides a communication node having a first function to realize transfer of packet and having a second function being an additional function different from said first function, wherein said communication node comprises:

address grasping means for grasping address of a predetermined communication node having said first function;

searching means for generating and transmitting a search packet having address of said predetermined communication node as destination address with the purpose of searching a communication node having said first function and said second function; and address acquiring means for acquiring address of a communication node having said first function and said second function by receiving a notifying packet containing address of a communication node having said first function and said second function, said communication node being the first receiver of a response packet transmitted as a response to said search packet by said predetermined communication node, or by receiving said response packet containing address of the communication node having said first function and said second function, said communication node being the first receiver of said response packet.

With the arrangement as described above, the communication node can search a communication node mounted with a desired function by transmitting a search packet to a predetermined communication node.

Further, the present invention provides the communication node with the above arrangement, wherein said searching means inserts desired information into payload of said search packet so that said predetermined communication node offers said desired information included in payload of said response packet to a communication node having said first function and said second function, said communication node being a first receiver of said response packet, and said desired information being the information contained in payload of said search packet as it is.

With the arrangement as described above, the communication node can provide desired information to a communication node, which is the search object.

Also, the present invention provides the communication node with the above arrangement, wherein said communication node comprises search request receiving means for receiving a search request of a communication node having said first function and said second function at least including address of said predetermined communication node from a movable mobile node, and for generating and transmitting said search packet based on the receiving of said search request.

With the arrangement as described above, the mobile node can search a communication node mounted with a desired function by using this communication node as proxy.

Further, the present invention provides the communication node with the above arrangement, wherein a communication node having a first function to realize transfer of packet and having a second function being an additional function different from said first function, wherein said communication node comprises:

packet transfer means for transferring a packet;

search packet detecting means for detecting a search packet transmitted from a first communication node to a second communication node with the purpose of searching a communication node having said first function and said second function; and packet modifying means for rewriting source address of said search packet to address of own communication node when said search packet has been detected by said search packet detecting means.

With the arrangement as described above, a communication node identified by source address of a search packet, which reaches the second communication node, can be turned to the search object of the first communication node.

Also, the present invention provides the communication node with the above arrangement, wherein a communication node having a first function to realize transfer of packet and having a second function being an additional function different from said first function, wherein said communication node comprises:

packet transfer means for transferring a packet; and response packet detecting means for grasping that own communication node is a search object of said first communication node by detecting a response packet to the search packet, said search packet being transmitted from a first communication node to a second communication node with the purpose of searching a communication node having said first function and said second function.

With the arrangement as described above, the communication node can grasp that own communication node is the search object of the first communication node by receiving the response packet to the search packet.

Further, the present invention provides the communication node with the above arrangement, wherein said communication node comprises address notifying means for generating and transmitting a notifying packet having address of said first communication node contained in said response packet as destination address and including address of own communication node.

With the arrangement as described above, the address of the communication node can be notified to the first communication node by a notifying packet.

Also, the present invention provides the communication node with the above arrangement, wherein said communication node comprises response packet discarding means for discarding said response packet.

With the arrangement as described above, useless transfer of the response packet can be prevented.

Further, the present invention provides the communication node with the above arrangement, wherein said communication node comprises:

address insertion detecting means for detecting whether or not address of another communication node having said first function and said second function is inserted in a predetermined region in said response packet;

address inserting means for inserting address of own communication node in a predetermined region in said response packet when it has been detected at said address insertion detecting means that address of said another communication node is not inserted; and said response packet where address of said another communication node is inserted is transferred when it is detected that address of said another communication node is not inserted at said address insertion detecting means, and said response packet is transferred without modifying the packet when it is detected that address of said another communication node is inserted at said address insertion detecting means.

With the arrangement as described above, the address of a communication node, which is the search object of the first communication node, can be notified to the first communication node by a response packet.

Also, the present invention provides the communication node with the above arrangement, wherein said first function is fulfilled by the mounting of IPv6 and ICMPv6, and said search packet and said response packet are arranged to be an echo request packet and an echo response packet of ICMPv6 respectively.

With the arrangement as described above, a predetermined communication node can transmit an echo response packet including the content of an echo request packet without modifying it to source address of the echo request packet of ICMPv6.

Further, the present invention provides the communication node with the above arrangement, wherein said second function is fulfilled by the mounting of NSIS, and a communication node is searched, which is mounted with NSIS and being the first receiver of said response packet transmitted from said predetermined communication node.

With the arrangement as described above, the communication node can identify a communication node, which is present in the vicinity of a predetermined communication node and has NSIS QoS function, and can start earlier updating of QoS path.

The present invention has the arrangement as described above and provides such effects that a communication node having special function can be identified under the condition that a certain communication node knows only the address of a communication node having no special function.

BRIEF DESCRIPTION OF THE DRAWINGS

FIG. 16 is a drawing to show an example of packet arrangement of nnQNE search packet in the embodiment of the present invention;

BEST MODE FOR CARRYING OUT THE INVENTION

Figure 1:
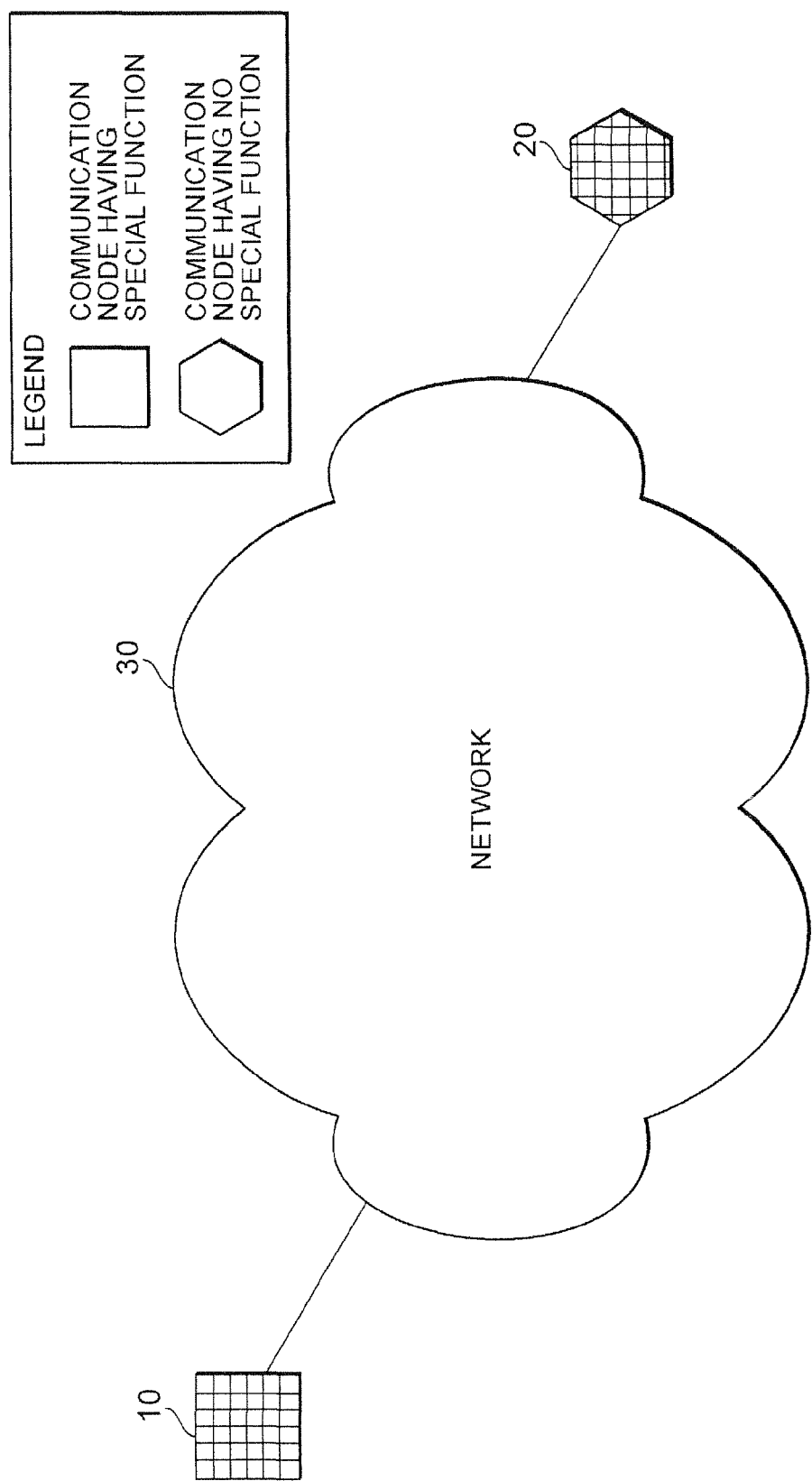
FIG. 1 is a schematical drawing to show an example of a communication system in an embodiment of the present invention.

Description will be given below on an embodiment of the present invention referring to the drawings. First, referring to FIG. 1 to FIG. 10, description will be given on general features of the present invention. Further, by referring to FIG. 11, description will be given on a case where the present invention is applied when MN performs handover between different subnets under the condition where NSIS QoS is used.

First, general features of the present invention will be described. FIG. 1 is a drawing to show an example of a communication system in the embodiment of the present invention.

The most basic purpose of the present invention is to identify a communication node, which has a special function and is present in the vicinity of another communication node can be identified under the condition where a certain communication node knows only an address of another communication node. That is, according to the present invention, a first communication node 10 and a second communication node 20 are mutually connected to a network 30 as shown in FIG. 1, and a mechanism is provided, in which a third communication node, being present in the vicinity of the second communication node 20 and having a special function, can be identified under the condition where the first communication node 10 knows only the address (IP address) of the second communication node 20. When the third communication node, being present in the vicinity of the second communication node 20 and having a specific function, is identified, it will be sufficient to grasp that the third communication node itself is a search object of the first communication node 10, or it will be sufficient that the first communication node 10 grasps the address of the third communication node. In the following, however, description will be given on a case where the third communication node grasps the third communication node itself is a search object of the first communication node 10 and the first communication node grasps the address of the third communication node.

In the communication system shown in FIG. 1, the first communication node 10 transmits a specific packet (a search packet), which has the address of the second communication node as destination address. This search packet is so arranged that it can be understood as a packet having a specific meaning to a communication node having a special function. Further, the search packet is transferred as it is by a communication node (router) in a network, which has no function to perform the conventional type transfer processing, and it is so arranged that the response packet is sent back to the search packet in case the communication node set up at the destination address (the second communication node 20) receives the search packet.

The minimum function, which the second communication node 20 must have (may be called "essential function" hereinafter), is a function to transmit a packet for response, which has a content directly copying the content of a predetermined packet (data of payload of the predetermined packet) when the predetermined packet is received and which has the transmitter of the predetermined packet as destination. Specifically, this is the function to send back the content of the received packet directly to the source address of the packet, and this function can be fulfilled by echo request/echo response of ICMPv6 normally provided in IPv6 as to be described later.

Figure 2:
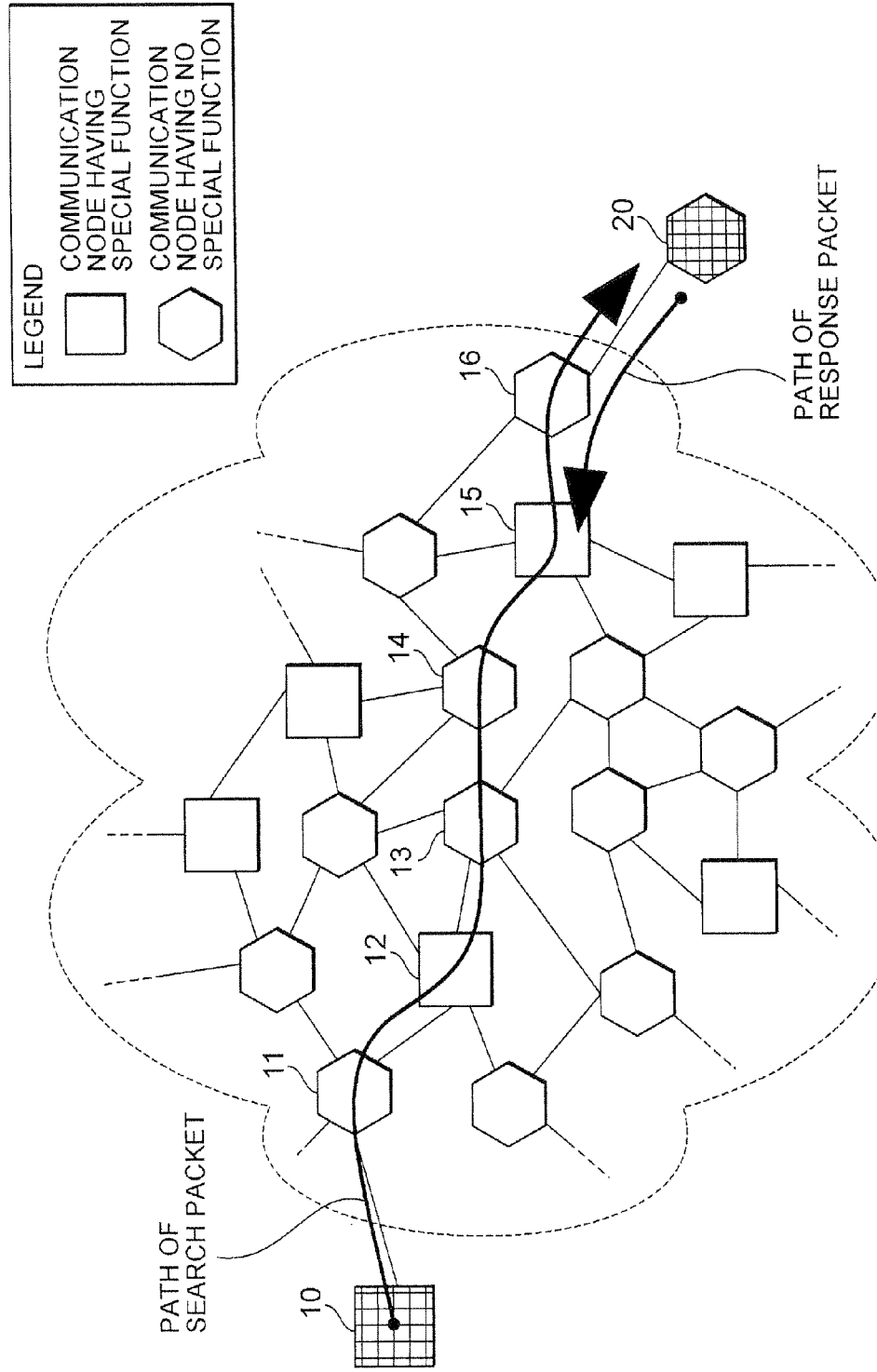
FIG. 2 is a drawing to concretely illustrate an example of an arrangement in a network shown in FIG. 1.

FIG. 2 is a drawing to concretely illustrate an example of arrangement in the network shown in FIG. 1. In FIG. 2, an example arrangement of communication nodes in the network 30 is shown in the communication system shown in FIG. 1. The network 30 has such an arrangement that a plurality of communication nodes (routers) are connected with each other. By transfer function of the communication nodes in the network 30, an adequate packet is transferred. As a result, the packet is sent to the correct destination.

Also, the network 30 is so arranged that communication node having special function and communication node having no special function are mixed together. It can naturally occur that the communication nodes in the network 30 have the functions different from each other. For instance, all communication nodes in the network 30 are provided with IPv6, ICMPv6, etc. Further, an example may be taken on the case where some of the communication nodes are provided with NSIS QoS or the like to fulfill QoS function.

The search packet, which is sent from the first communication node 10 and has the address of the second communication node as destination address, is adequately transferred between the communication nodes in the network 30 and reaches the second communication node 20. As shown in FIG. 2, an example is taken on a case where the search packet transmitted from the first communication node 10 is sent via communication nodes 11-16 (The communication nodes 11, 13, 14 and 16 are the communication nodes having no special functions, and the communication nodes 12 and 15 have special functions.) and reaches the second communication node 20. In this case, the network 30 shown in FIG. 2 has mesh type topology, but there is no specific limitation to network topology, and the network 30 may be arranged as a plurality (multiple stages) of networks. Also, the route of the search packet is adequately determined by a routing table of each communication node in the network 30, and the first communication node 10 basically cannot know how and via which route in the network 30 the search packet reaches the second communication node 20.

Description will be given below on general outline of operation to attain the basic purpose of the present invention. In the description given below, the direction from the first communication node 10 to the second communication node 20 in FIG. 2 is defined as ascending direction, and the direction from the second communication node 20 to the first communication node 10 is defined as descending direction. In the operation to attain the basic purpose of the invention, there are combinations of several operation patterns. First, description will be given on these several operation patterns by referring to FIG. 3 to FIG. 6.

Figure 3:
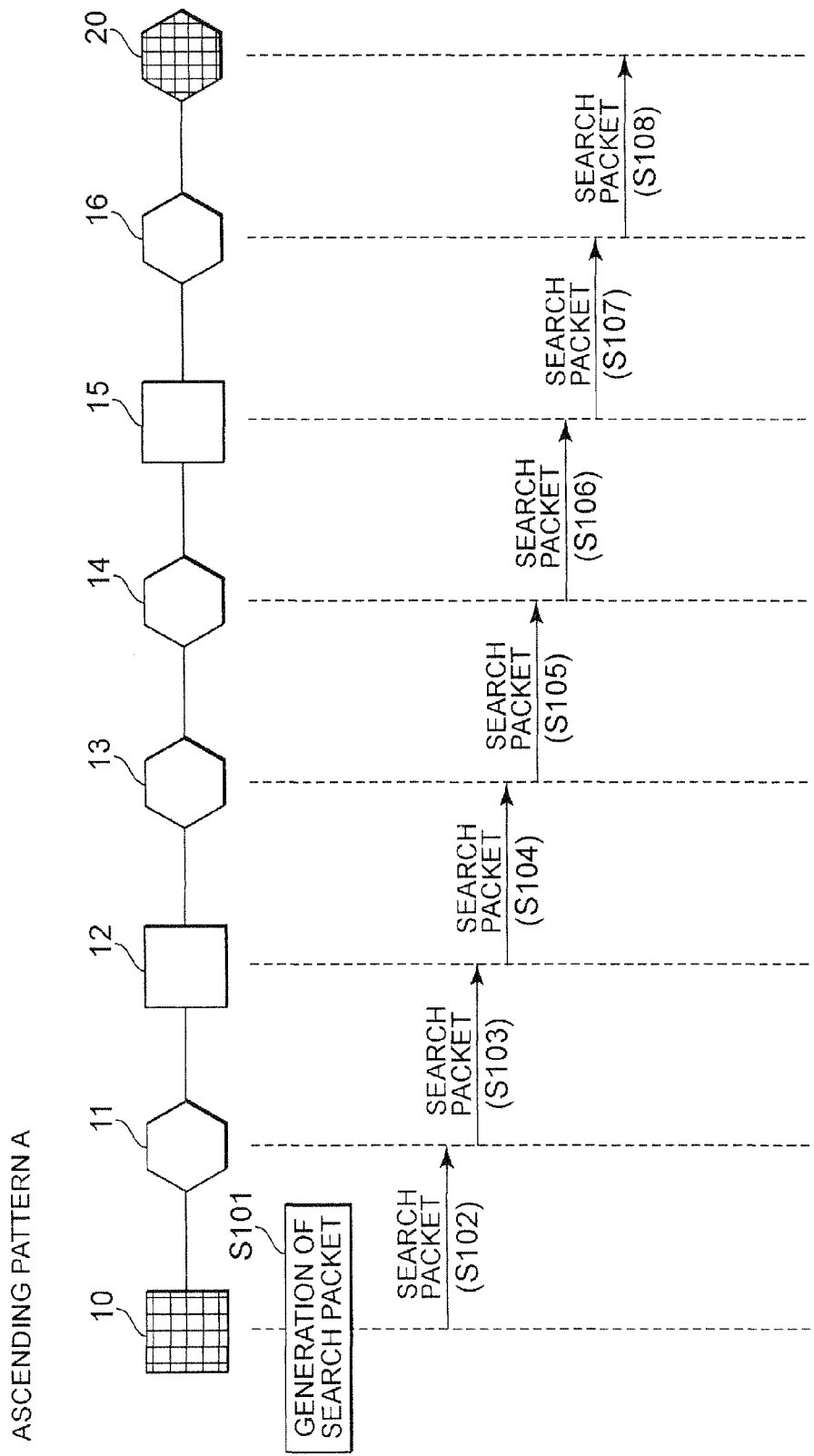
FIG. 3 is a sequence chart to show a first example (an ascending pattern A) of an operation pattern in ascending direction in the communication system shown in FIG. 2.

FIG. 3 is a sequence chart to show a first example (ascending pattern A) of the operation pattern in ascending direction in the communication system shown in FIG. 2. Here, it is based on the assumption that the first communication node 10 has acquired in advance the address of the communication node 20 as initial status.

When it is decided that a communication node, being present in the vicinity of the second communication node 20 and having a special function, is to be searched under the condition that the first communication node 10 knows the address of the second communication node 20, the first communication node 10 generates a search packet, which has the address of the second communication node 20 as destination address (Step S101) and transmits this search packet (Step S102). The search packet transmitted from the first communication node 10 passes through the network 30 by the conventional type transfer processing and reaches the second communication node 20 (Steps S103-S108).

As described above, according to the ascending pattern A shown in FIG. 3, the communication node in the network 30 transfers the search packet by the conventional type transfer processing, and the second communication node 20 can receive the search packet transmitted from the first communication node 10 in the state as it is.

Figure 4:
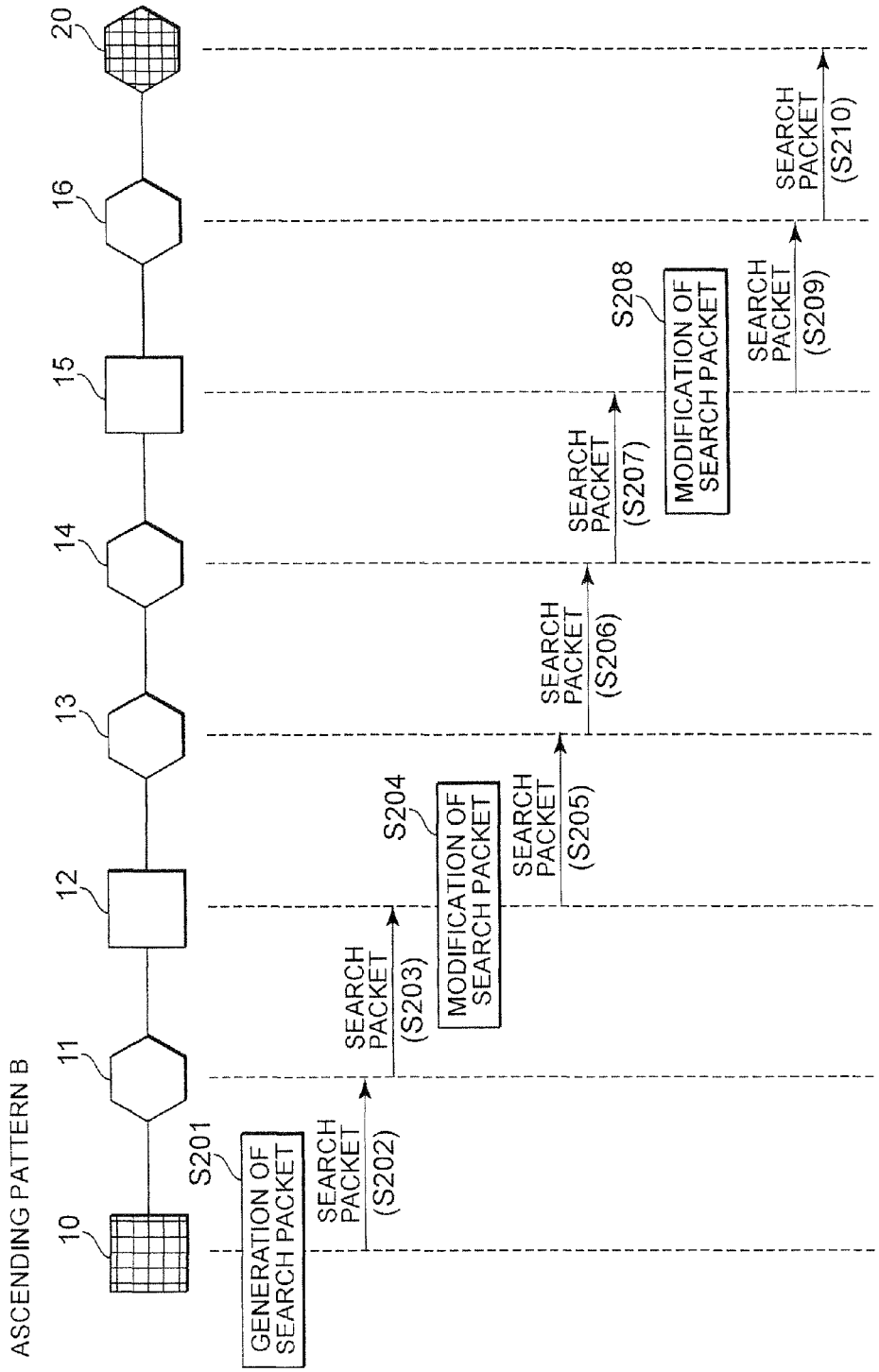
FIG. 4 is a sequence chart to show a second example (an ascending pattern B) of an operation pattern in ascending direction in the communication system shown in FIG. 2.

FIG. 4 is a sequence chart to show a second example of operation pattern (ascending pattern B) in ascending direction in the communication system shown in FIG. 2. Here, too, similarly to the ascending pattern A, it is based on the assumption that the first communication node 10 has acquired the address of the second communication node 20 in advance as the initial state by a certain method.

When the first communication node 10 decides to search a communication node, which is present in the vicinity of the second communication node 20 and has a special function, under the condition that it knows the address of the second communication node 20, the first communication node 10 generates a search packet, which has the address of the second communication node 20 as destination address (Step S201) and transmits the search packet (Step S202).

The search packet transmitted from the first communication node 10 is transferred by the conventional type transfer processing in the communication nodes having no special functions, while the search packet is processed by some modifying processing in the communication nodes having special functions and is transferred. Specifically, as shown in FIG. 4, the communication nodes 11, 13, 14 and 16 having no special functions transfer the search packet by the conventional type packet transfer processing similarly to the ascending pattern A as given above (Steps S203, S206, S207 and S210), while the communication nodes 12 and 15 having special functions perform modifying processing on the search packet (Steps S204 and S208) and transfer the search packet after the modifying processing (Steps S205 and S209).

In the modifying processing of the search packet performed by the communication nodes 12 and 15 having special function, a processing to change source address of the search packet to the address of own node or a processing to describe the address of own node on a certain region in the search packet is included.

In the processing to change the source address of the search packet to the address of own node, the source address of the search packet is rewritten to the address of the communication node each time the search packet passes through the communication node having special function. In this case, the address of the transmitter (the first communication node 10) initially set up at the source address of the search packet may be deleted by the modifying processing of the search packet. Therefore, it is desirable that there is provided another region to store the address of the transmitter, which generated and transmitted the search packet, within the search packet and that the address of the transmitter, which generated and transmitted the search packet, is maintained in said another region when the search packet is generated by the transmitter or when the modifying processing is performed on the search packet by the modifier of the initial search packet (the communication node 12 in this case).

Also, in the processing to describe and update the address of own node in a predetermined region in the search packet, the predetermined region in the search packet is to be rewritten to the address of the communication node each time the search packet passes through the communication node having special function.

As described above, according to the ascending pattern B shown in FIG. 4, the second communication node 20 can receive the search packet, in which the address of the communication node transferred lastly and having special function (the communication node 15 shown in FIG. 2) is written in the source address or on the predetermined region in the transfer of the search packet in the network 30.

Figure 5:
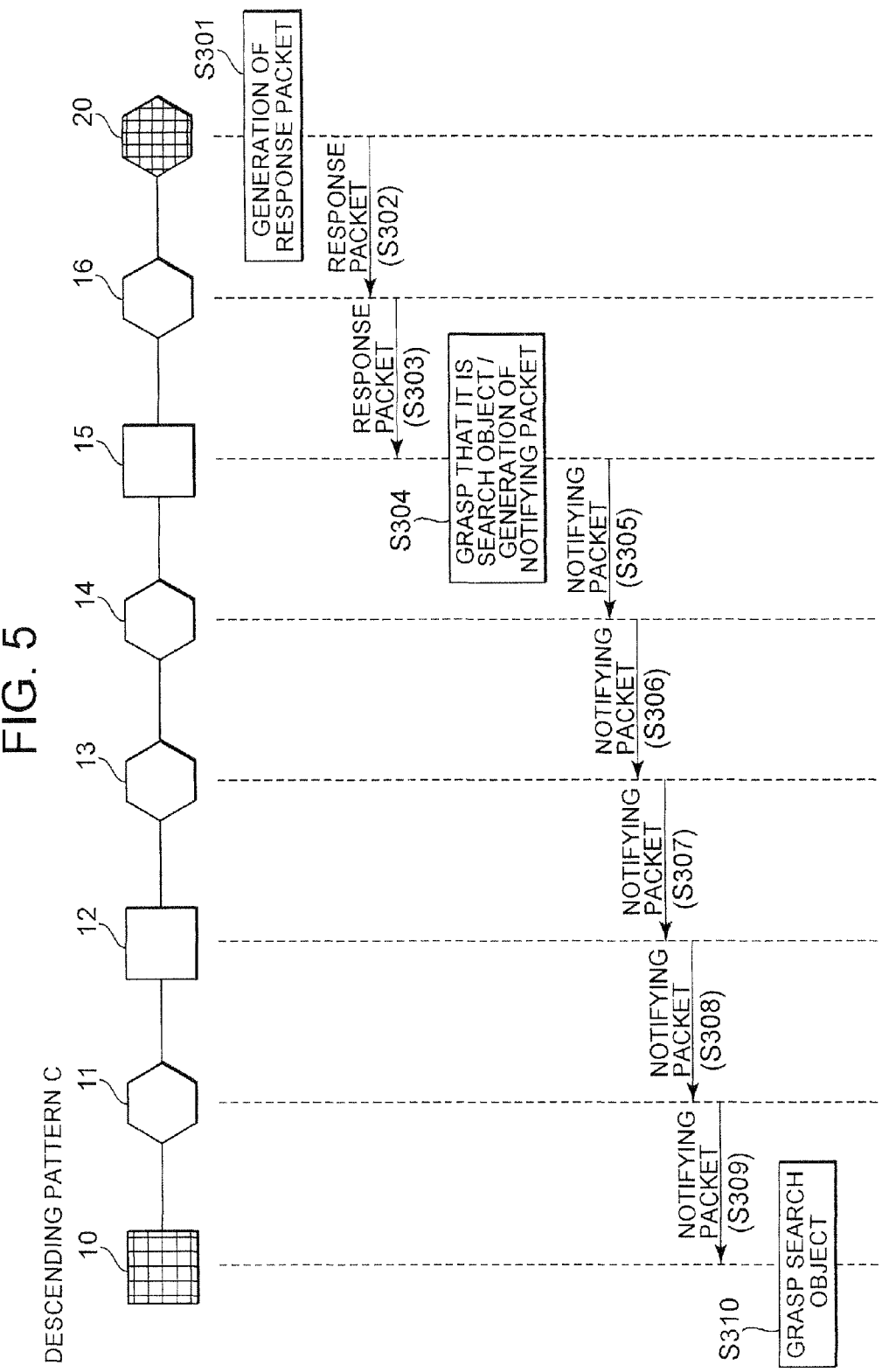
FIG. 5 is a sequence chart to show a first example (a descending pattern C) of an operation pattern in descending direction in the communication system shown in FIG. 2.

Further, FIG. 5 is a sequence chart to show a first example of the operation pattern in descending direction (descending pattern C) in the communication system shown in FIG. 2. In this case, it is based on the assumption that the second communication node 20 has received the search packet generated and transmitted by the first communication node 10.

Upon receipt of the search packet, the second communication node 20 generates a response packet to the search packet (Step S301) and transmits the response packet (Step S302). This response packet at least contains information to indicate that it is a response to the search packet to search the communication node having special function, and also the address of the first communication node 10. As the destination address to be set in the response packet, the address of the first communication node 10 or the address of the communication node, which performed the transfer of the search packet lastly and has special function (the communication node 15 in this case), is set up for each of the ascending patterns A and B as given above respectively.

The response packet transmitted from the second communication node 20 reaches the communication node 15 having special function via the conventional type transfer processing at the communication node 16 (Step S303). The communication node 15 refers to the information indicating that it is a response to the search packet, which searches the communication node having special function in the response packet and grasps that own node is a search object (the third communication node). Then, it generates a notifying packet to notify that the node itself is the search object to the first communication node (Step S304) and transmits this notifying packet to the first communication node 10 (Step S305). In case the address of the first communication node 10 is set to the destination address of the response packet, it is desirable that the communication node discards the response packet so that further transfer may not be carried out.

The notifying packet transmitted from the communication node 15 reaches the first communication node 10 by the conventional type transfer processing (Steps S306-S309). Upon receipt of this notifying packet, the first communication node 10 grasps that the communication node 15 is the search object (Step S310).

As described above, according to the descending pattern C shown in FIG. 5, the communication node 15 can grasp that the search object wanted by the first communication node 10 is the communication node 15 itself. Also, the first communication node 10 can grasp that the communication node 15 is the search object.

Figure 6:
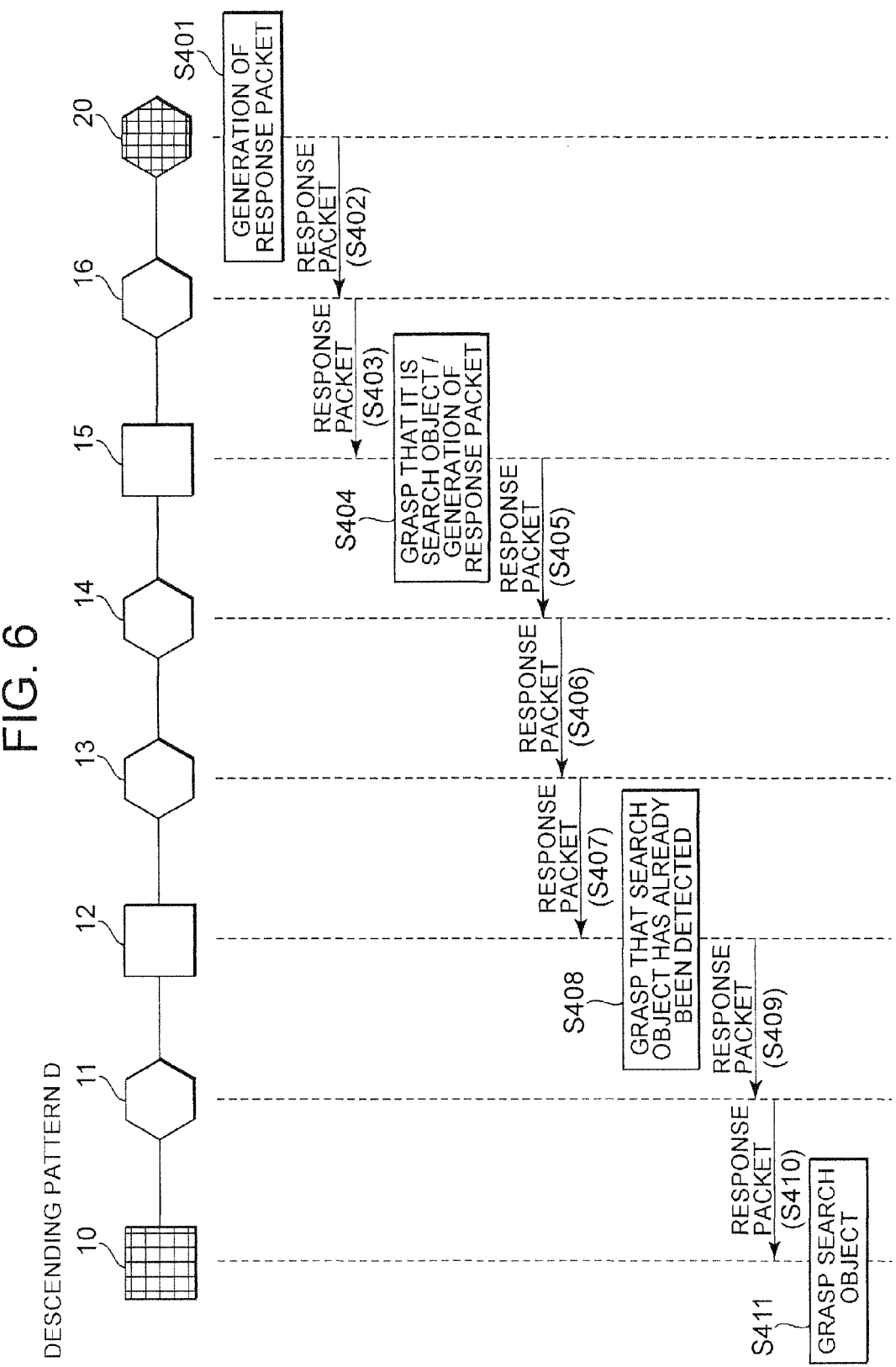
FIG. 6 is a sequence chart to show a second example (a descending pattern D) of an operation pattern in descending direction in the communication system shown in FIG. 2.
Figure 7:
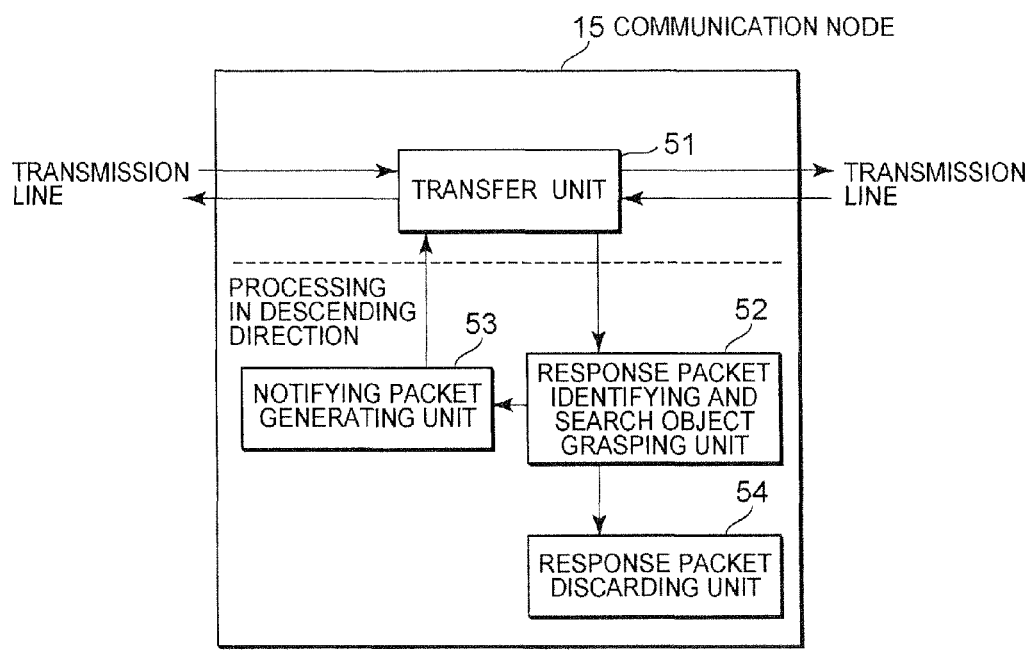
FIG. 7 is a block diagram to show an arrangement example of a communication node in a network in a case where the ascending pattern A shown in FIG. 3 is combined with the descending pattern C shown in FIG. 5.

FIG. 6 is a sequence chart to show a second example of the operation pattern in descending direction (descending pattern D) in the communication system shown in FIG. 2. Here, too, similarly to the descending pattern C as given above, it is based on the assumption that the second communication node 20 has received the search packet generated and transmitted by the first communication node 10.

Upon receipt of the search packet, the second communication node 20 generates a response packet to the search packet (Step S401) and transmits the response packet (Step S402). This response packet at least contains information to indicate that it is a response to the search packet to search the communication node having special function. At the destination address of the response packet, address of the first communication node 10 is set up. Further, in the response packet, there is a region to indicate whether the search object has been detected or not. When the response packet is transferred at the second communication node 20, information is set up in this region to indicate that the search object is not detected yet.

The response packet transmitted from the second communication node 20 reaches the communication node 15 having special function via the conventional type transfer processing at the communication node 16 (Step S403). The communication node 15 refers to the information to indicate that it is a response to the search packet to search the communication node having special function in the response packet and grasps that the node itself is the search object (the third communication node). Then, it modifies the response packet (Step S404) and transfers the modified packet (Step S405).

As the modifying processing to modify the response packet to be performed by the communication node 15 after grasping that it is itself the search object, there are included, for instance, a processing to change source address of the response packet to the address of own node or a processing to describe the address of own node in a predetermined region in the response packet. Further, after grasping that it is itself the search object, the communication node 15 sets up information to indicate that the search object has been already detected in a region to indicate whether the search object has been received or not in order to show that the search object relating to this response packet has been already detected.

The response packet containing the information to indicate that the search object has been already detected reaches the communication node 12 having special function by the conventional type transfer processing at the communication nodes 14 and 13 (Steps S406 and S407). The communication node 12 having special function grasps that the information to indicate that the search object has been already detected is present (Step S408) and transfers the response packet by the conventional type transfer processing (Step S409). Further, the response packet reaches the first communication node 10 via the conventional type transfer processing at the communication node 11 (Step S410). Then, upon receipt of the response packet, the first communication node 10 grasps that the communication node 15 is the search object (Step S411).

As described above, according to the descending pattern D shown in FIG. 6, the communication node 15 can grasp that the search object searched by the first communication node 10 is the communication node 15 itself, and the first communication node 10 can grasp that the communication node 15 is the search object.

In the above, description has been given on two patterns (the ascending patterns A and B) in the transfer of the search packet in the present invention and on two patterns (the descending patterns C and D) in the transfer of the response packet relating to the present invention. Next, description will be given below on the function of each communication node and on the information to be carried by the packet as requested when the ascending patterns A and B and the descending patterns C and D are combined together.

(Combination of the Ascending Pattern A with the Descending Pattern C)

In the ascending pattern A, the second communication node 20 receives the search packet transmitted from the first communication node 10 under the condition as it is. Upon receipt of the search packet, the second communication node 20 generates and transmits a response packet, which has the address of the first communication node 10 as destination address.

On the other hand, in the descending pattern C, the communication node 15 having special function must be able to grasp that it is itself the search object when receiving the response packet.

Therefore, the communication node having special function (e.g. the communication node 15) must be able to transfer the search packet by a transfer unit 51 to perform the conventional type transfer processing and to identify the response packet that it is the first communication node having special function to receive the response packet by the receiving of the response packet and also must have the function to grasp that the search object by the communication node (the first communication node 10) as set up at destination address of the response packet is own node (response packet identifying and search object grasping unit 52). Also, the communication node having special function must have the function to generate and transmit the notifying packet to notify that own node is the search object (notifying packet generating unit 53).

Further, upon receipt of the response packet, the communication node having special function grasps that own node is the search object and may have the function to stop further transfer of the response packet and to discard the response packet (response packet discarding unit 54) to reduce useless traffic within the network.

On the other hand, the communication node having no special function must be able to adequately transfer the search packet and the response packet.

The search packet and the response packet as described above can be realized by an echo request packet and an echo response packet of ICMPv6, for instance. The first communication node 10 transmits an echo request packet including information to indicate that it is to search the third communication node, being present in the vicinity of the second communication node 20 and having special function, and the echo request packet, which has the address of the second communication node 20 as destination address, is transmitted as the search packet.

The echo request packet reaches the second communication node 20 without being specifically modified in the network 30, and the second communication node 20 transmits the echo response packet of ICMPv6 to the first communication node 10 by directly copying the content of the echo request packet (i.e. the information to indicate that it is to search the third communication node being present in the vicinity of the second communication node 20 and having special function).

Also, the communication node having special function in the network 30 checks the echo response packet of ICMPv6 as it is, and when the information is included, which indicates that it is to search the third communication node being present in the vicinity of the second communication node 20 and having special function, the communication node grasps that it is itself the search object.

It may be so arranged that, by adding RAO to the echo request packet or to the echo response packet and by prompting the processing and the interpretation of the echo request packet or the echo response packet to the communication node in the network 30, the communication node having special function in the network 30 can interpret that the echo request packet or the echo response packet is to be a search packet or a response packet respectively.

As described above, by the combination of the ascending pattern A with the descending pattern C, it would be possible that, under the condition that a certain communication node (the first communication node 10) grasps only the address of another communication node (the second communication node 20), the communication node having special function (communication node 15) and being present in the vicinity of the another communication node (the second communication node 20) can be identified.

(Combination of the Ascending Pattern A with the Descending Pattern D)

In the ascending pattern A, the second communication node 20 receives the search packet transmitted from the first communication node 10 under the condition as it is. Therefore, when the search packet has been received, the second communication node 20 generates and transmits a response packet having the address of the first communication node 10 as destination address by the essential function as given above.

On the other hand, in the descending pattern D, upon receipt of the response packet, the communication node 15 having special function grasps whether or not the node itself is the first communication node having special function, which has received the response packet, i.e. whether a communication node having special function is present or not, which has received the response packet before own node. If it is the first communication node having special function, which has received the response packet, it can grasp that own node is the search object.

Figure 8:
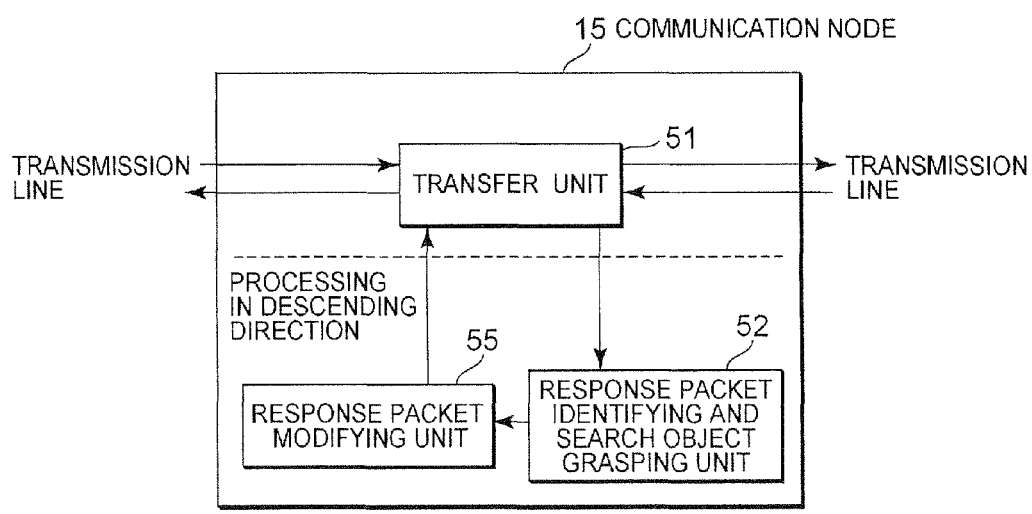
FIG. 8 is a block diagram to show an arrangement example of a communication node in a network in a case where the ascending pattern A shown in FIG. 3 is combined with the descending pattern D shown in FIG. 6.
Figure 9:
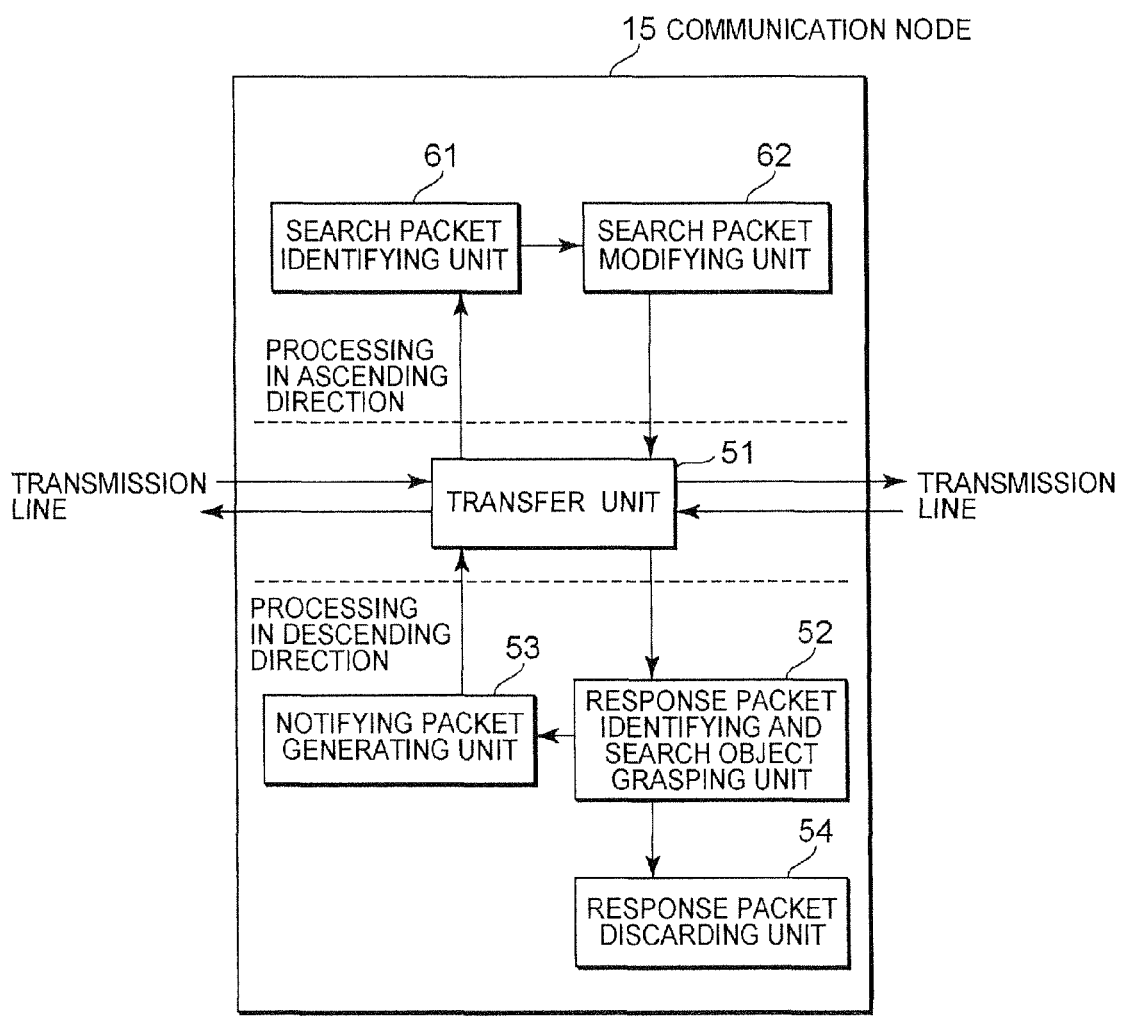
FIG. 9 is a drawing to show an arrangement example of a communication node in a network in a case where the ascending pattern B shown in FIG. 4 is combined with the descending pattern C shown in FIG. 5.
Figure 10:
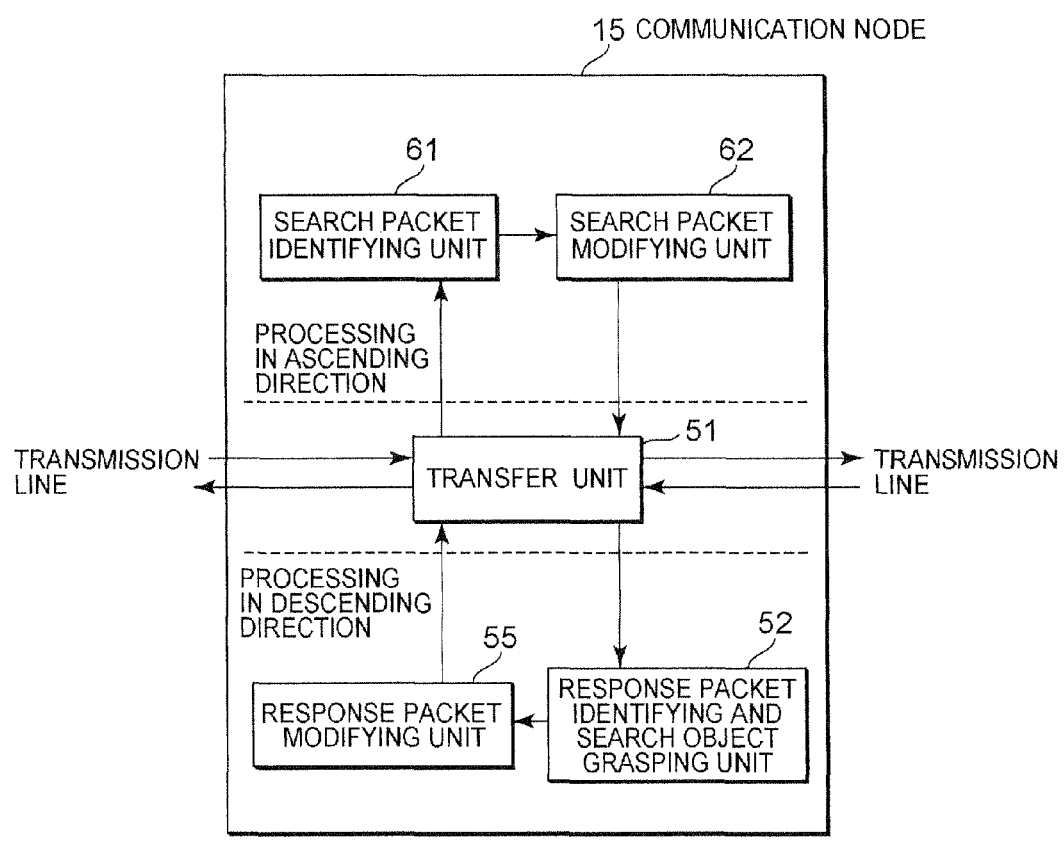
FIG. 10 is a drawing to show an arrangement example of a communication node in a network in a case where the ascending pattern B shown in FIG. 4 is combined with the descending pattern D shown in FIG. 6.

Therefore, as shown in FIG. 8, the communication node having special function (e.g. the communication node 15) must have the function to transfer the search packet by the transfer unit 51 for performing the conventional type transfer processing as it is and to grasp that the search object by the communication node having the address of the response packet as destination address (the first communication node 10) is own node (a response packet identifying and search object grasping unit 52). Further, the communication node having special function must have the function to modify the response packet to indicate that the communication node having special function, which receives the response packet thereafter, is not to be the search object (a response packet modifying unit 55).

On the other hand, the communication node having no special function must be able to adequately transfer the search packet and the response packet.

The search packet and the response packet as described above can be achieved by the echo request packet and the echo request packet of ICMPv6, for instance. The first communication node 10 is the echo request packet including the data to indicate that it is to search the third communication node, which is in the vicinity of the second communication node 20 and has special function, and the echo request packet, which has the address of the second communication node 20 as destination address, is transmitted as the search packet.

The echo request packet reaches the second communication node 20 without being specifically modified in the network 30, and the second communication node 20 transmits the echo response packet of ICMPv6 to the first communication node 10 by directly copying the content of the echo request packet (i.e. the information to indicate that it is to search the third communication node being present in the vicinity of the second communication node 20 and having special function).

Also, the communication node having special function in the network 30 checks the content of the echo response packet. If the information is included, which indicates that it is to search the third communication node being in the vicinity of the second communication node 20 and having special function, it is confirmed first whether the search object has been already detected or not. If the information is included, which indicates that the search object is not detected yet, it is grasped that own node is the search object. Then, the processing is performed to rewrite the information that the search object has been already detected regarding the data in the echo response packet or the processing to write the address of own node is performed, and it is transferred. On the other hand, if the data is included, which indicates that the search object has already been detected, it is transferred without performing further processing.

It may be so arranged that, by adding RAO to the echo request packet or to the echo response packet and by prompting the processing and the interpretation of the echo request packet or the echo response packet to the communication node in the network 30, the communication node having special function in the network 30 can interpret that the echo request packet or the echo response packet is to be a search packet or a response packet respectively.

As described above, by the combination of the ascending pattern A with the descending pattern D as given above, it can be so designed that, under the condition that a communication node (the first communication node 10) grasps only the address of another communication node (the second communication node 20), the communication node (the communication node 15) being present in the vicinity of another communication node (the second communication node 20) and having special function can be identified.

(Combination of the Ascending Pattern B with the Descending Pattern C)

In the ascending pattern B, the second communication node 20 receives a search packet, which has been modified by the communication node having special function in the network 30. In the modification processing of the search packet, there are two patterns: a first pattern where the source address of the search packet is rewritten to the address of the communication node having special function in the network 30, and a second pattern where the address of the communication node having special function in the network 30 is added as the data in the search packet. Therefore, upon receipt of the search packet, the second communication node 20 generates and transmits the response packet, which has the address of the communication node having special function in the network 30 as destination address, in case of the first pattern by the essential function as given above. In case of the second pattern as given above, it generates and transmits the response packet, which has the address of the first communication node 10 as destination address.

On the other hand, in the descending pattern C, the communication node 15 having special function must be able to grasp that own node is the search object when the response packet is received.

Accordingly, the communication node having special function (e.g. the communication node 15) must have a function to grasp that the received packet is the search packet (a search packet identifying unit 61) and a function to perform modification processing of the search packet in addition to the transfer unit 51 to perform the conventional type transfer processing (a search packet modifying unit 62).

In case of the first pattern as given above, the search packet modifying unit 62 must have a function to rewrite the source address of the search packet. In this case, it is necessary to arrange that the address of the initial transmitter of the search packet (i.e. the address of the first communication node 10) remains in the search packet after the modification. To attain this purpose, it may be so arranged by the first communication node 10 that the address of the node is contained in advance in the data in the search packet (i.e. in a region where the communication node having special function does not rewrite). Also, it can be so designed that the communication node having special function moves the address of the initial transmitter of the search packet to the data (i.e. a region where the communication node having special function and receiving the search packet subsequently does not rewrite) in the search packet when rewriting the address and it is maintained within the search packet. On the other hand, in case of the second pattern as given above, the search packet modifying unit 62 must have a function to overwrite the address of own node in a predetermined address describing region of the data in the search packet.

Further, the communication node having special function must have a function to identify the response packet and a function to grasp that own node is the search object by receiving the response packet (the response packet identification and search object grasping unit 52). In case of the first pattern as given above, the response packet identification and search object grasping unit 52 can grasp that the address of own node is set as the destination address of the response packet. On the other hand, in case of the second pattern, by finding whether the address of own node is contained in the data in the response packet or not or by receiving the response packet, the response packet identifying and search object grasping unit 52 can grasp that it is the first communication node having special function, which has received the response packet, and also can grasp that the search packet by the communication node (the first communication node 10) with the address set as the destination address of the response packet is own node.

Also, the communication node having special function must have a function to generate and transmit a notifying packet to notify that own node is the search object to the receiver of the response packet (the notifying packet generating unit 53). In case of the first pattern, the address of the initial transmitter of the search packet is included in a predetermined region of the data in the response packet, and this address is set to the destination address of the notifying packet. On the other hand, in case of the second pattern as given above, a notifying packet is generated and transmitted, which has the communication node with the address set as the destination address of the response packet (the first communication node 10).

In the second pattern as given above, in case the communication node having special function, which receives the response packet, may have a function to stop further transfer of the response packet and to discard the response packet (the response packet discarding unit 54) in case it grasps that own node is the search object in order to reduce useless traffic in the network (response packet discarding unit 54).

On the other hand, the communication node having no special function must be able to adequately transfer the search packet and the response packet.

The search packet and the response packet as described above can be realized by the echo request packet and the echo response packet of ICMPv6. The first communication node 10 transmits an echo request packet including information to indicate that it is to search the third communication node, which is present in the vicinity of the second communication node 20 and has special function, and an echo request packet with the address of the second communication node 20 as destination address is transmitted as the search packet. Also, the first communication node 10 may describe the address of own node in a predetermined region of the data in the echo request packet.

The communication node having special function in the network 30 checks the content of the echo request packet, and if information is included to indicate that it is to search the third communication node, which is present in the vicinity of the second communication node 20 and has special function, the destination address or the address of own node is overwritten in a predetermined address describing region.

Upon receipt of the echo request packet, the second communication node 20 transmits the echo response packet of ICMPv6 by directly copying the content of the echo request packet toward the first communication node 10 (may include the information to indicate that it is to search the third communication node being present in the vicinity of the second communication node 20 and having special function, and further, may include the address of initial transmitter of the search packet).

Also, the communication node having special function in the network 30 checks the content of the echo response packet, and if the data to indicate that it is to search the third communication node, being present in the vicinity of the second communication node 20 and having special function, is included, it grasps that own node is the search object.

Further, it may be so arranged that the communication node having special function in the network 30 can interpret the echo request packet or the echo response packet as the search packet or the response packet respectively by adding RAO to the echo request packet or to the echo response packet and by prompting the processing and the interpretation of the echo request packet or the echo response packet to the communication node in the network 30.

As described above, by the combination of the ascending pattern B with the descending pattern C as given above, it can be so designed that, under the condition that a communication node (the first communication node 10) grasps only the address of another communication node (the second communication node 20), it is possible to identify the communication node (the communication node 15), which is present in the vicinity of another communication node (the second communication node 20).

(Combination of the Ascending Pattern B with the Descending Pattern D)

In the ascending pattern B, the second communication node 20 receives the search packet modified by the communication node having special function in the network 30. In the processing to modify the search packet, there are two patterns: a first pattern where the source address of the search packet can be rewritten to the address of the communication node having special function in the network 30 as described above, and a second pattern where the address of the communication node having special function in the network 30 is added as the data in the search packet. In the combination with the descending pattern D, only the case of the above second pattern is possible.

On the other hand, in the descending pattern D, the communication node 15 having special function grasps whether or not own node is the first communication node having special function to receive this response packet when the response packet is received (i.e. whether a communication node having special function is present or not, which received the response packet before own node), and if it is the first communication node having special function which has received this response packet, it must be able to grasp that own node is the search object.

Therefore, the communication node having special function (e.g. the communication node 15) must have a function to identify that the received packet is the search packet (the search packet identifying unit 61) in addition to the transfer unit 51 to perform the conventional type transfer processing and also a function to overwrite the address of own node in a predetermined address describing region of the data in the search packet (the search packet notifying unit 62). Also, the communication node having special function must have a function to identify the response packet, and in case the address of own node is included in the data of the response packet or in case it is the first receiver of this response packet, it must have a function to grasp that the search object by the communication node with the address set as the destination address of the response packet (the first communication node 10) is own node (the response packet identifying and search object grasping unit 52), and the communication node having special function and receiving the response packet thereafter must have a function to modify the response packet (the response packet modifying unit 55) in order to indicate that it is not turned to the search object.

On the other hand, the communication node having no special function must be able to adequately transfer the search packet and the response packet.

The search packet and the response packet as described above can be realized by the echo request packet and the echo response packet of ICMPv6, for instance. The first communication node 10 is an echo request packet including information to indicate that it is to search the third communication node, being present in the vicinity of the second communication node 20 and having special function, and it transmits an echo request packet, which has the address of the second communication node 20 set as destination address, as the search packet.

The communication node having special function in the network 30 checks the content of the echo request packet, and if the information is included, which indicates that it is to search the third communication node, being present in the vicinity of the second communication node 20 and having special function, the address of own node is overwritten in a predetermined address describing region.

Upon receipt of this echo request packet, the second communication node 20 transmits the echo response packet of ICMPv6 toward the first communication node 10 by directly copying the content of the echo request packet (may include the information to indicate that it is to search the third communication node, being present in the vicinity of the second communication node 20 and having special function, and may include the address of initial transmitter of the search packet).

Also, the communication node having special function in the network 30 checks the content of the echo response packet, and if the information is included, which indicates that it is to search the third communication node, being present in the vicinity of the communication node 20 and having special function, it confirms first whether the search object has been already detected or not. If the information is included, which indicates that the search object is not detected yet, it is grasped that own node is the search object, and it performs the processing such as the processing to rewrite the information to indicate that the search object has already been detected or the processing to transfer after describing the address of own node. On the other hand, in case the data is included, which indicates that the search object has already been detected, transfer is performed without carrying out further processing. Also, the communication node having special function in the network 30 may grasp that own node is the search object in case the address of own node is included in the data in the response packet.

It may be so arranged that the communication node having special function in the network 30 may interpret the echo request packet or the echo response packet as the search packet or the response packet respectively by adding RAO to the echo request packet or to the echo response packet and by prompting the processing and the interpretation of the echo request packet or the echo response packet to the communication node in the network 30.

As described above, by the combination of the ascending pattern B with the descending pattern D, it can be so designed that, under the condition where a communication node (the first communication node 10) grasps only the address of another communication node (the second communication node 20), the communication node (the communication node 15) being present in the vicinity of another communication node and having special function (the second communication node 20) can be identified.

The embodiment as described above is based on the assumption that the path of the search packet (the path in ascending direction) is identical with the path of the response packet (the path in descending direction). In the combination of the ascending pattern B with the descending pattern D, if the address of own node is included in the data in the response packet, the communication node having special function can be operated even in case where the path in ascending direction is different from the path in descending direction except the case where it grasps that own node is the search object.

When the first communication node 10 generates the search packet, the address of other communication node to perform the processing as a proxy of the first communication node 10 or the address of other communication node such as the communication node, which is a correspondent node of the communication node 10, may be set at the source address of this search packet. For instance, by using the address of CN, which performs communication with the first communication node 10, as the destination address of the search packet, the response packet is transmitted to CN. As a result, the communication node being present in a direction from the second communication node 20 toward CN and in the vicinity of the second communication node 20 and having special function is identified as a search object. This is particularly useful because QNE is discovered along this new path when the first communication node 10 performs handover to change connection destination to the second communication node 20 and a new QoS path via the second communication node 20 is set up between the first communication node 10 and CN.

Also, in the embodiment as given above, it is simply arranged that the third communication node (the communication node 15), being present in the vicinity of the second communication node 20 and having special function, can be identified under the condition where the first communication node 10 grasps only the address of the communication node 20. By inserting desired information to be transmitted to the communication node as the data of the search packet when the first communication node generates the search packet, desired information can be transmitted to the third communication node with unknown address in a one-time packet transmission (search packet transmission).

Further, each communication node having special function can change over the operation relating to the ascending pattern A and the operation relating to the ascending pattern B. Specifically, by the combination of the ascending pattern A with the ascending pattern B, the search packet may be transmitted. For instance, when a communication node having special function transfers the search packet, if it is known that the search packet passes via another communication node having special function until it reaches the destination address (e.g. it can be grasped when the search packet is transferred by peer-to-peer transfer between QNEs using NSIS), the operation relating to the ascending pattern A (to transfer the search packet directly without modifying) is performed. In case it is not known that the search packet passes through another communication node having special function until it reaches the destination address or in case it is known that the search packet does not pass through the other communication node having special function until it reaches the destination address, the operation relating to the ascending pattern B (to rewrite destination address of the search packet to the address of own node and to transfer) may be carried out.

Also, in the ascending pattern B or the descending pattern D as given above, the third communication node having special function in the network 30, which is not turned to the search object as a result (e.g. the communication node 12) can refer to the data in the search packet. Therefore, in the ascending pattern B and the descending pattern D, desired information in the search packet can be transmitted to any communication node present on the path between the first communication node 10 and the second communication node 20 and having special function. Also, it can also be so arranged that QNE existing on the path can perform the processing relating to QUERY just as nnQNE search packet as described later.

In the above, description has been given on general features of the operation of the present invention. In particular, the invention is useful when the special function is NSIS QoS. Description will be given below on operation in a case where QNE is searched, which is present in the vicinity of AR to be connected after the handover (nAR) when MN performs the handover between subnets.

Figure 11:
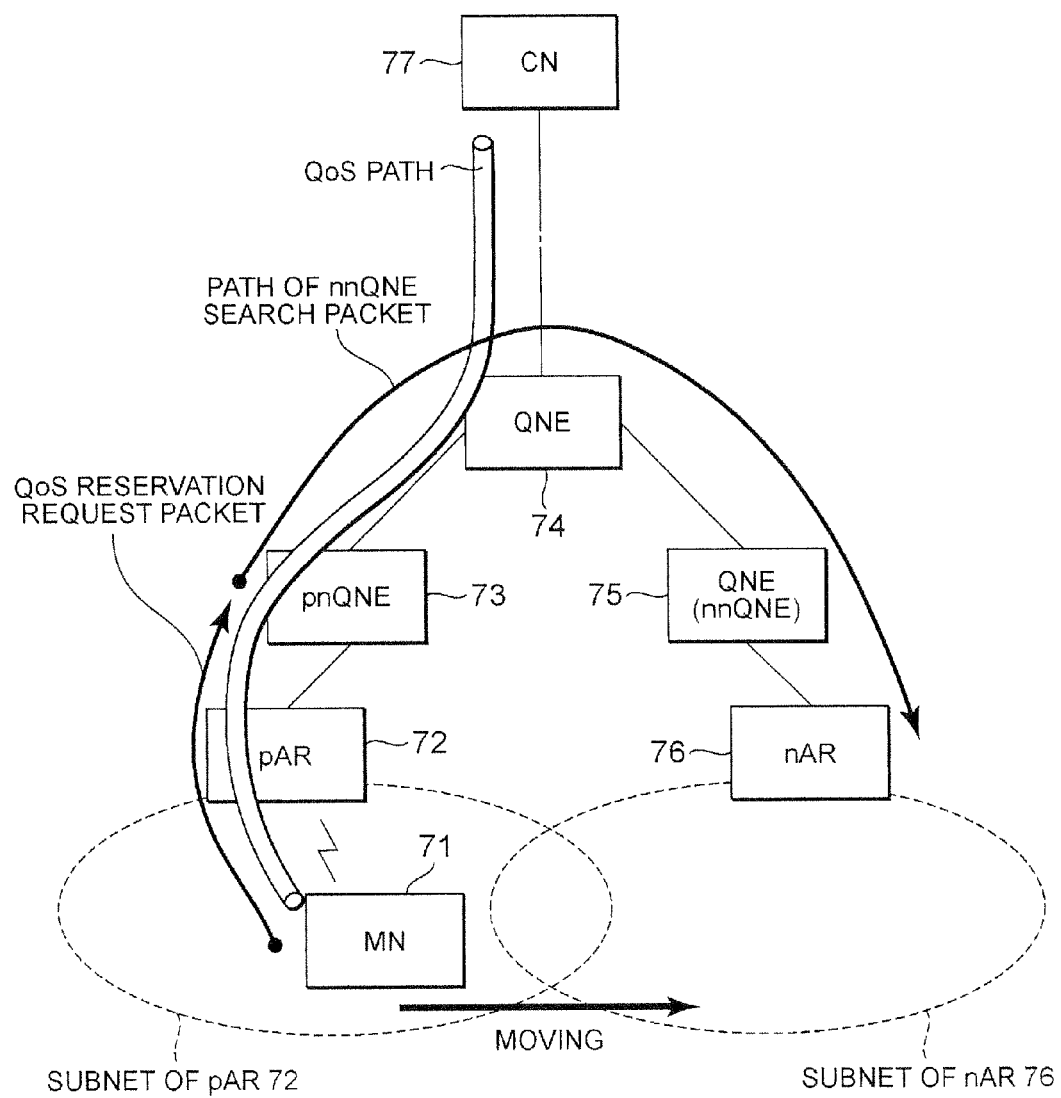
FIG. 11 is a schematical drawing to show another example of a communication system in the embodiment of the present invention.

FIG. 11 is a drawing to show another example of a communication system in an embodiment of the present invention. FIG. 11 shows: MN 71, which is a radio communication node (mobile node) to perform communication by changing the connection point through connection change with AR; AR (pAR) 72 where MN 71 is connected before the handover and AR (nAR) 76 where it is connected after handover; pnQNE (previous neighbor QNE) 73, which is QNE adjacent to MN 71 connected with nAR 72; QNE 74 and QNE 75 being present on the path between pnQNE and nAR 76; and CN 77 where QoS path is set up to MN 11.

Here, it is assumed that MN 71 and CN 77 are QNEs mounted with NSIS QoS, and QoS path based on NSIS QoS can be built up between MN 71 and CN 77. Also, it is assumed that nAR 76 has no special function (NSIS) (i.e. it is not QNE). Further, a plurality of routers (or NEs) may be present between QNEs, but routers and NEs are not shown in FIG. 11.

Here, description will be given on a case where MN 71 requests pnQNE 73 to transmit nnQNE (next neighbor QNE) search packet. A method, in which MN 71 transmits nnQNE search packet is the simplest. However, there is no guarantee that MN 71 trying to perform the handover is continuously connected to pAR 72 up to the time of subsequent processing, and it is very useful that MN 71 requests proxy processing of MN 71 to other QNE (e.g. pnQNE 73). Upon receipt of the request from MN 71, pnQNE 73 performs the processing, which is to be carried out by MN 71, on behalf of MN 71.

In the communication system shown in FIG. 11, let us consider a case where MN 71 performs the handover to change the connection from the subnet of pAR 72 to the subnet of nAR 76. In this case, QoS path between MN 71 and CN 77 must be updated in response to the handover. Here, description will be given on a case where MN 71 transmits information necessary for reservation (or updating) of QoS path needed after the handover to pnQNE 73 before performing the handover and requests the search of QNE (nnQNE) present in the vicinity of nAR 76, and searches nnQNE as a proxy of MN 71, and the information necessary for the reservation of QoS path between MN 71 and CN 77 is delivered to nnQNE with respect to the discovered nnQNE. MN 71 can acquire the address of pnQNE 73, which is a neighbor QNE by the operation relating to NSIS. Also, as to be described later, the address of nAR 76 can be acquired by a method as desired.

Figure 12:
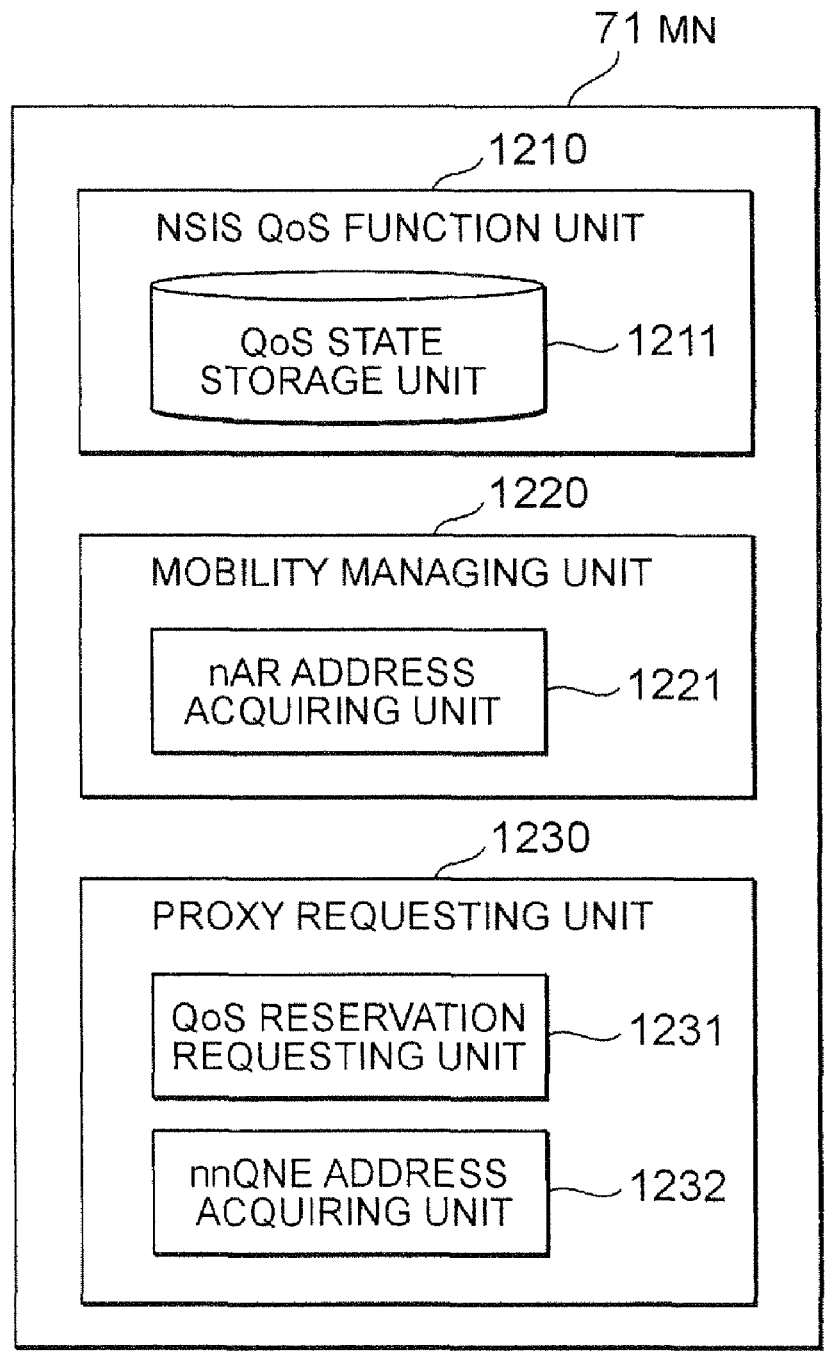
FIG. 12 is a block diagram to show an example of arrangement of MN in the communication system shown in FIG. 11.

Here, description will be given on the arrangement of MN 71 and QNEs (pnQNE 73, QNE 74 and QNE 75) in the communication system shown in FIG. 11. First, referring to FIG. 12, the arrangement of MN 71 is described. FIG. 12 is a drawing to show an example of arrangement of MN in the communication system shown in FIG. 11. In FIG. 12, only major functions relating to the present invention in MN 71 are shown.

MN 71 shown in FIG. 12 comprises an NSIS QoS function unit 1210, a mobility managing unit 1220, and a proxy requesting unit 1230. Each of the functions can exchange information as necessary.

The NSIS QOS function unit 1210 indicates that MN 71 is mounted with NSIS. This NSIS QoS function unit 1210 performs the processing relating to NSIS QoS such as resource reservation and has a QoS state storage unit 1211 for storing the information relating to QoS.

Also, the mobility managing unit 1220 has a function to perform the mobility management processing in advance (before moving). For instance, it has an nAR address acquiring unit 1221, which can acquire address of nAR 76 to be connected after moving under the condition connected to pAR 72.

Further, the proxy requesting unit 1230 has a function to request proxy processing of the search of nnQNE to pnQNE 73. For instance, it has a QoS reservation requesting unit 1231 to request the proxy processing for the search of nnQNE by generating and transmitting a QoS reservation requesting packet and an nnQNE address acquiring unit 1232 to acquire address of nnQNE by receiving the results of the search by pnQNE 73 (nnQNE notifying packet including the address of nnQNE).

Figure 13:
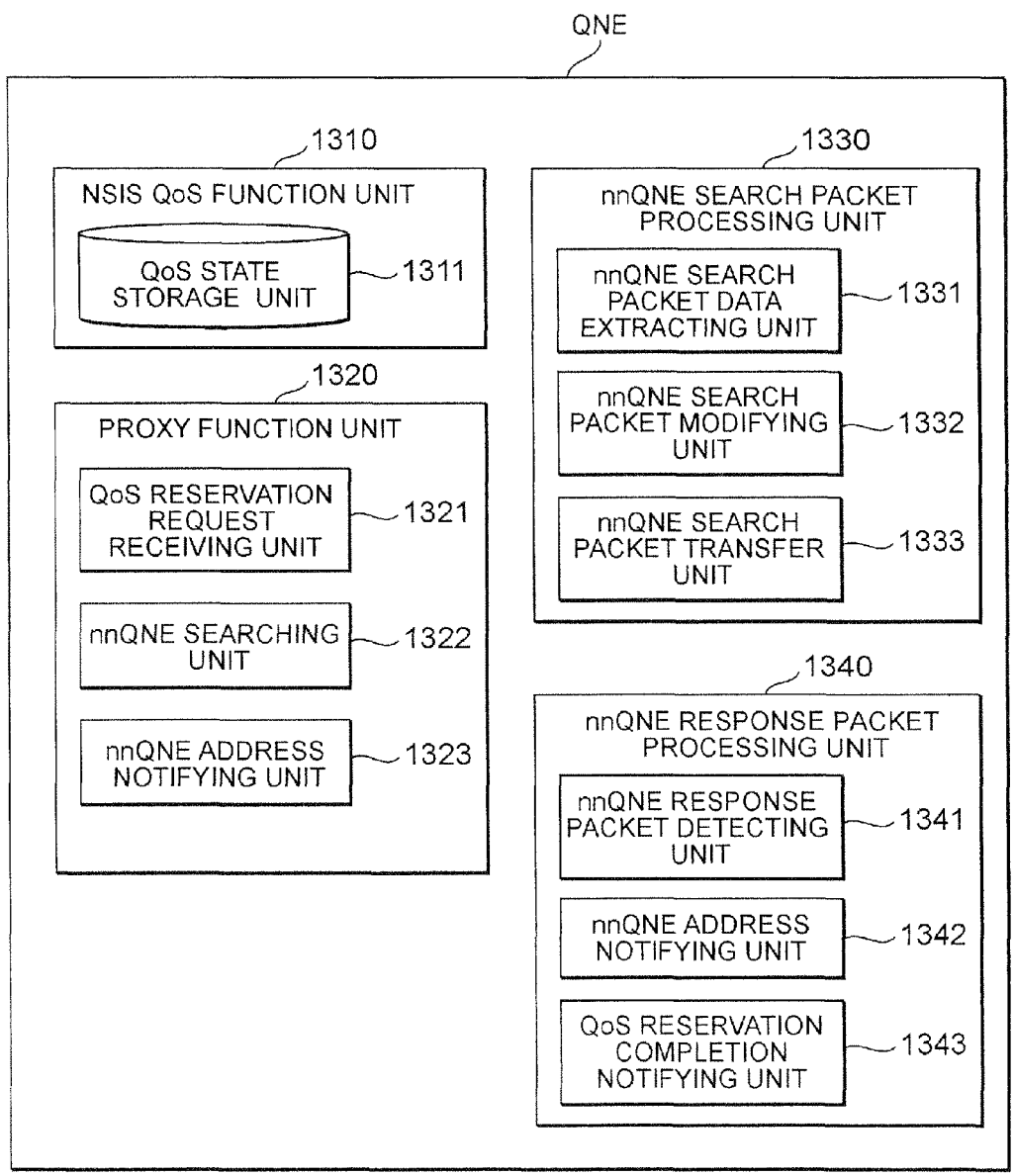
FIG. 13 is a block diagram to show an example of arrangement of QNE in the communication system shown in FIG. 11.

Next, description will be given on the arrangement of QNE by referring to FIG. 13. FIG. 13 is a drawing to show an example of arrangement of QNEs in the communication system shown in FIG. 11. QNEs in the network can be any of the QNEs, which relay pnQNE, nnQNE and packets. The QNEs shown in FIG. 13 represent the arrangement of all of these QNEs. Also, FIG. 13 shows only major functions relating to the present invention in QNEs.

The QNE shown in FIG. 13 has an NSIS QoS function unit 1310, a proxy function unit 1320, an nnQNE search packet processing unit 1330, and an nnQNE response packet 1340. Each of these function units can exchange information as necessary.

The NSIS QoS function unit 1310 is identical with the NSIS QOS function unit 1210 shown in FIG. 12. Specifically, it is represented that QNE is mounted with NSIS, and it has a QoS state storage unit 1311 to perform the processing relating to NSIS QoS including resource reservation and to store information relating to QoS.

The proxy function unit 1320 has a function to receive the requesting of proxy processing for the search of nnQNE. For instance, it has: a QoS reservation request receiving unit 1321 for receiving the request of proxy processing for the search of nnQNE by receiving QoS reservation request packet from MN 71, an nnQNE searching unit 1322 for performing proxy processing for the search of nnQNE by generating and transmitting an nnQNE search packet, and an nnQNE address notifying unit 1323 for generating and transmitting an nnQNE notifying packet to receive the nnQNE notifying packet for notifying the address by grasping that it is nnQNE and to notify the address of nnQNE to MN 71.

The nnQNE search packet processing unit 1330 has a function to perform the processing of the nnQNE search packet. For instance, it has an nnQNE search packet data extracting unit 1331 for extracting the data in nnQNE search packet, an nnQNE search packet modifying unit 1332 for performing the processing to rewrite source address of the nnQNE search packet to the address of own node, and an nnQNE search packet transfer unit 1333 for transferring the modified nnQNE search packet to its destination address. The data in the nnQNE search packet as extracted by the nnQNE search packet data extracting unit 1331 is sent to the NSIS QoS function unit 1310, and the processing relating to NSIS QoS such as QUERY processing is carried out.

Further, the nnQNE response packet processing unit 1340 has a function to perform the processing relating to the nnQNE response packet. For instance, it has an nnQNE response packet detecting unit 1341 for grasping that own node is nnQNE by detecting an nnQNE response packet from the received packet, an nnQNE address notifying unit 1342 for generating and transmitting the nnQNE notifying packet to notify to pnQNE 73 that own node is nnQNE, and a QoS reservation completion notifying unit 1343 for notifying MN 71 that QoS processing for MN 71 has been completed, which is to be performed after grasping that it is nnQNE (e.g. QoS reservation processing up to a predetermined CN). The data in the nnQNE response packet detected by the nnQNE response packet detecting unit 1341 is sent to the NSIS QoS function unit 1310, and the NSIS QoS function unit 1310 performs QoS reservation processing or the like according to this data.

Figure 14:
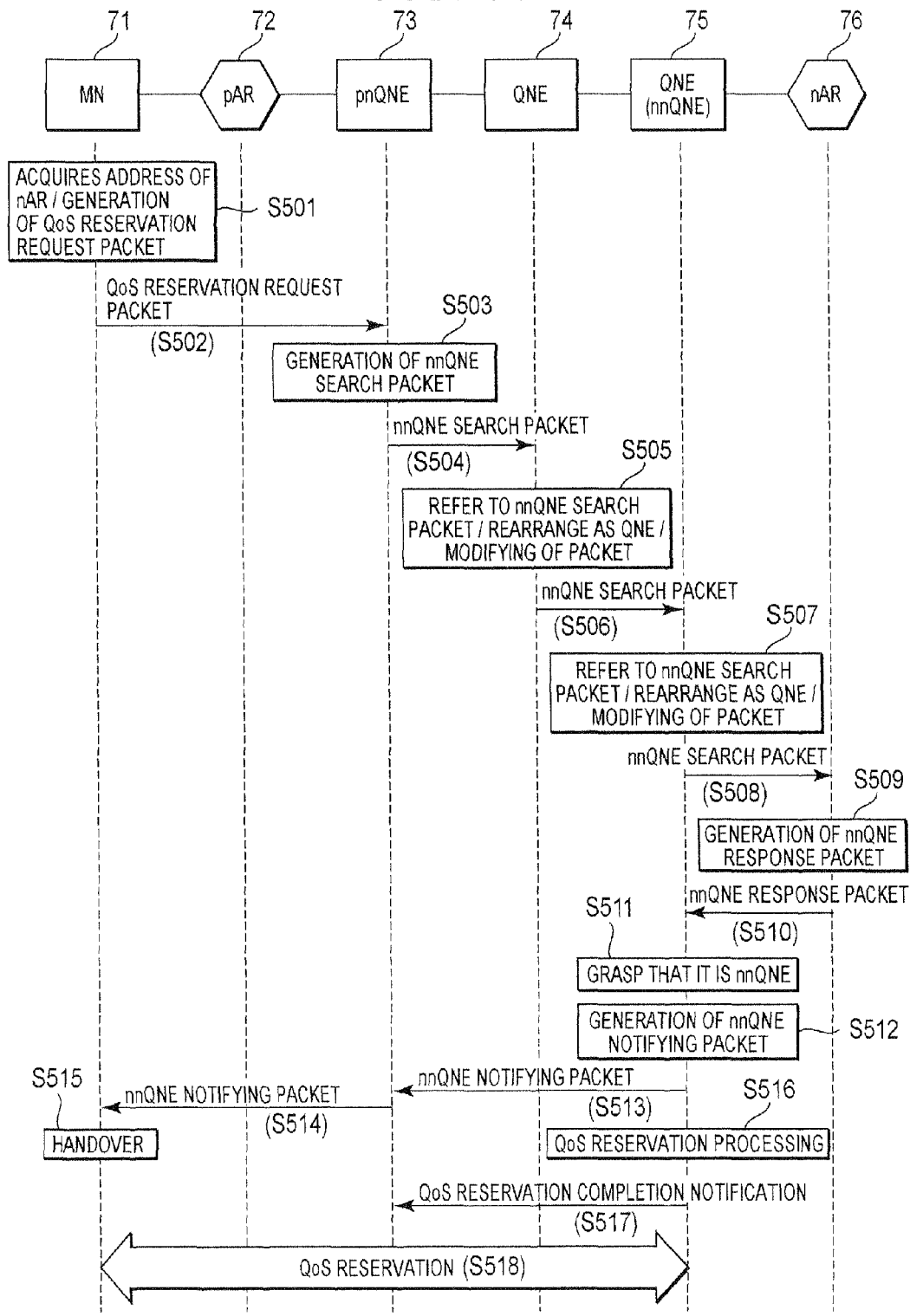
FIG. 14 is a sequence chart to show an example of arrangement when MN performs handover between subnets in a case where a special function in the embodiment of the present invention is NSIS QoS.

Next, description will be given on an example of operation in the communication system shown in FIG. 11. FIG. 14 is a sequence chart to show an example of operation when MN performs handover between subnets in case special function in the embodiment of the present invention is NSIS QoS. FIG. 14 shows only major communication nodes. For instance, it does not show the communication nodes for performing the conventional type transfer processing between QNEs (i.e. communication nodes corresponding to the communication nodes 11, 13, 14 and 16 shown in FIG. 2; e.g. router mounted with IPv6 or ICMPv6 only, or NE not mounted with NSLP for QoS).

First, MN 71 acquires address of nAR 76 under the condition that it is connected to pAR 72 and generates a QoS reservation requesting packet (Step S501). The QoS reservation requesting packet is a packet for requesting transmission of nnQNE search packet to nAR 76. As the method for acquiring the address of nAR 76, by which MN 71 acquires the address of nAR 76, any method may be adopted. For instance, a method may be used, which acquires the address of nAR 76 of upper layer by using L2 information received from AP under the control of nAR 76 (not shown). Also, the operation according to the present invention may be carried out after grasping that nAR 76 is mounted with NSIS QoS by some other method.

MN 71 transmits QoS reservation requesting packet, which has the address of QNE (pnQNE 73) neighboring to MN 71 as the destination address (Step S502). Upon receipt of the QoS reservation requesting packet, pnQNE 73 generates an nnQNE search packet, which has the address of nAR 76 as destination address in the format of echo response packet of ICMPv6 based on the data included in the QoS reservation requesting packet (Step S503) and transmits it to nAR 76 (Step S504).

Here, description will be given on information included in the QoS reservation requesting packet and the nnQNE search packet. The QoS reservation requesting packet is a packet, by which MN 71 requests pnQNE 73 to perform the search of nnQNE in proxy. At least, the information to indicate that the proxy of the search of nnQNE is requested (e.g. clearly indicated by a flag or the like). Even when the information is not clearly indicated, it is possible to express the requesting of the proxy for the search of nnQNE by giving the same implications to the packet arrangement.

Further, the following types of information may be included as the data of the QoS reservation requesting packet:

Address of MN 71

This is set to the source address of the QoS reservation requesting packet, and pnQNE 73 can easily acquire it. For instance, if MN 71 has already acquired a new CoA in the subnet of nAR 76, the new CoA may be included as the data of the QoS reservation requesting packet. This new CoA is used when a new flow identifier is generated on QoS path to be reserved (or updated).

Information to Identify nAR 76

It is desirable that this is the address of nAR 76. For instance, it may be L2 information received from AP (not shown) under the control of nAR 76. In this case, it also means the requesting of the proxy for the processing to identify the address of nAR 76 from L2 information to pnQNE.

Address of CN 77

This is used to identify one end point of QoS path, and it is also used in case a new flow identifier is to be generated on QoS path to be reserved (or updated).

Flow Identifier and Session Identifier on QoS Path Before Handover

These are used at the time of reservation (or updating) of QoS path. In particular, these are used for collation of old QoS path.

Information to Indicate the Content of Processing when nnQNE is Reached

For instance, it is possible to include an indicating information to control the operation at nnQNE, e.g. whether or not to request nnQNE perform reservation processing as soon as nnQNE has been discovered, and whether nnQNE address is to be notified or not to the discovered nnQNE. Even when this information is not clearly indicated, it is possible to express the requesting of the proxy for the search of nnQNE by giving similar implications to the packet arrangement itself.

Information Corresponding to QUERY Message

By delivering the content of a QUERY message, which is a message for checking in advance whether it is possible or not to make resource reservation as desired at each QNE, nnQNE search packet can be turned to a message, which corresponds to QUERY message of NSIS QoS. In this case, the nnQNE search packet also fulfills the function of a QUERY message. At the time of the discovery of nnQNE, the processing of QoS reservation can be promptly performed, and the time up to the completion of the QoS reservation processing can be reduced.

Content of a RESERVE Message

By delivering the content of a RESERVE message for resource reservation of QoS at each QNE, it is possible to include the content of the RESERVE message to the nnQNE search packet. As a result, the content of the RESERVE message used for QoS reservation at nnQNE can be properly included in the nnQNE search packet.

QoS Information as Desired (Qspec)

To make nnQNE perform QoS reservation processing or to give the function of the QUERY message to the nnQNE search packet, it is possible to include parameters of QoS used (e.g. information of QoS level).

Figure 15:
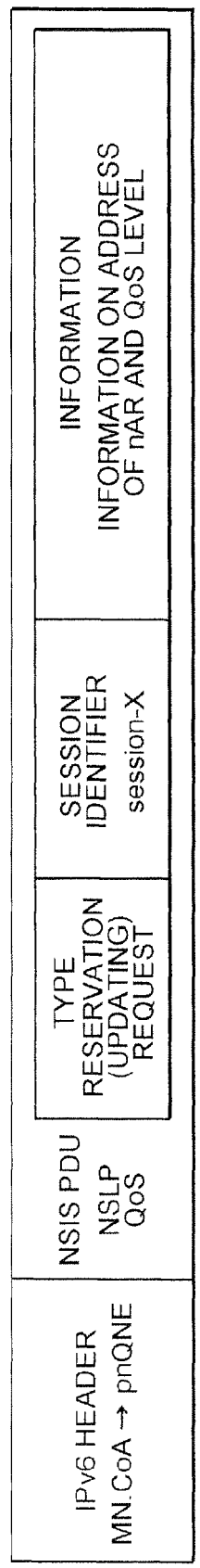
FIG. 15 is a drawing of an example of packet arrangement of a QoS reservation request packet in the embodiment of the present invention.

Further, FIG. 15 is a drawing to show packet arrangement of the QoS reservation requesting packet in the embodiment of the present invention. As shown in FIG. 15, the QoS reservation requesting packet has IPv6 header, in which CoA of MN 71 (MN.CoA) is set as source address and the address of pnQNE 73 as destination address. Also, QoS of NSLP is set as PDU (Protocol Data Unit) of NSIS. Such types of information include: information to indicate that reservation (updating) is requested, information relating to session identifier (session-X) of QoS path, address of nAR 76, information relating to QoS level, and further, the other information as given above (not shown).

On the other hand, information almost the same as QoS reservation requesting packet can be included in the nnQNE search packet. However, there are possibilities that the following types of information may be included:

Address of pnQNE 73

The address of pnQNE 73 is set as source address when pnQNE 73 transmits nnQNE search packet. However, it is necessary to prevent the deletion due to rewriting of source address.

Region to Indicate whether nnQNE has been Already Detected or Not (Reservation Region)

This region is to be used when QNE puts a mark of "detected" or "not detected yet" to the nnQNE response packet. When nnQNE transmits the nnQNE search packet, it is set to the mark "not detected yet". It may also be so arranged that the information (the mark "detected" or "not detected yet") is added to the nnQNE response packet without providing reservation region in the nnQNE search packet in advance.

RAO

There are cases where checking and processing of the nnQNE search packet are desired by QNE where the nnQNE search packet passes until the time when the packet reaches nAR 76. One of such cases is the case where the function of the QUERY message is given to the nnQNE search packet by giving the information corresponding to the QUERY message to the nnQNE search packet so that each QNE can perform processing on the QUERY message.

FIG. 16 is a drawing to show an example of packet arrangement of the nnQNE search packet in the embodiment of the present invention. As shown in FIG. 16, nnQNE search packet has IPv6 header, in which the address of pnQNE 73 is set as source address and the address of nAR 76 is set as destination address. Also, as RAO to be set to hop-by-hop option, NSIS QoS is set. As a result, it is requested that QNE mounted with the protocol according to NSIS QoS refers to the data of this packet. Also, echo request of ISMPv6 is set as PDU of ICMP, and the following types of information are included: information to indicate that the search of nnQNE is to be performed, information corresponding to session identifier (session-X) and flow identifier (flow-X) of QoS path, address of pnQNE 73, information corresponding to QUERY message (QUERY), information relating to QoS level, and further, the other information as given above (not shown).

Here, MN 71 requests the proxy of the search to pnQNE 73. Also, in case where MN 71 transmits nnQNE search packet, a packet having the content and the arrangement similar those of nnQNE search packet as given above is transmitted (except that the address of pnQNE 73 should be read as the address of MN 71).

Here, MN 71 delivers the content, which is to be included in the nnQNE search packet to be transmitted by pnQNE 73 as proxy is included in the QoS reservation requesting packet and is delivered to pnQNE 73, while it can be delivered by another packet. Some of the information may be delivered before deciding that the handover is to be performed, for instance. Also, pnQNE 73 grasps the information relating to QoS path of MN 71 via own node. Regarding such type of information, pnQNE 73 can acquire the information without receiving the information from MN 71. The information thus acquired is associated and stored in a predetermined information storage unit by pnQNE 73.

In the communication system shown in FIG. 2, pnQNE 73 corresponds to the first communication node, and nAR 76 corresponds to the second communication node. By the operation based on the ascending pattern A and the ascending pattern B as given above, the nnQNE search packet is transmitted from pnQNE 73 to nAR 76. Description will be given below on a case where RAO is added to the search packet in the ascending pattern B and operation is performed according to an example where source address is rewritten, while this may be used in other pattern.

When transmitted from pnQNE 73, the nnQNE search packet reaches QNE 74 by the transfer processing at the communication node in the network (Step S504). Upon receipt of nnQNE search packet, QNE 74 refers to the interior of the received packet and performs the processing as QNE of NSIS to QUERY in the nnQNE search packet and modifies source address of the received nnQNE search packet to the address of own node (Step S505). Then, the modified nnQNE search packet is transferred to an adequate next hop (Step S506).

At QNEs on transmission route of nnQNE search packet, the nnQNE search packet repeatedly receives the processing similar to receiving, processing, modifying and transfer processing of the nnQNE search packet in Steps S504-S506 as given above, and it is transferred toward nAR 76. After the procedure of receiving, processing, modifying and transfer processing (Steps S506-508) of the nnQNE search packet at QNE 75, the nnQNE search packet reaches nAR 76.

Figure 17:
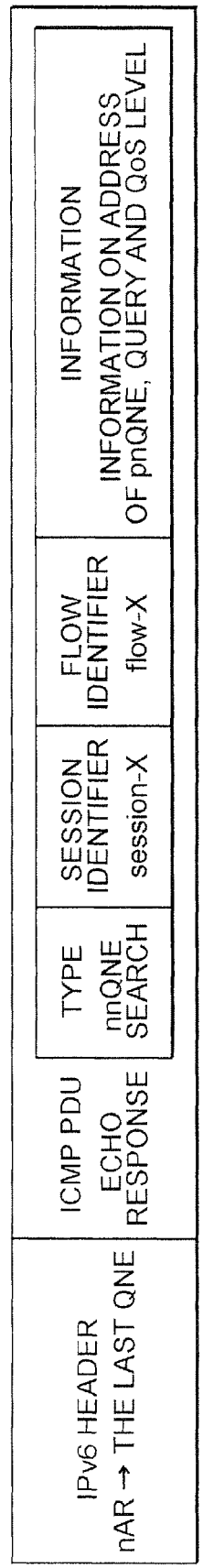
FIG. 17 is a drawing to show an example of packet arrangement of nnQNE response packet in the embodiment of the present invention.

Upon receipt of the nnQNE search packet, nAR 76 generates the nnQNE response packet, which is to be a response to the nnQNE search packet according to the format of the echo response packet of ICMPv6 because the nnQNE search packet has the format of the echo request packet of ICMPv6 (Step S509). The arrangement of the nnQNE response packet is the one shown in FIG. 17, for instance. In this case, nAR 76 generates an nnQNE response packet, which has the address described in source address of the nnQNE search packet as destination address. Here, the address of QNE 75, which has the transferred nnQNE search packet at the last time is described in the source address of the nnQNE search packet. Based on this source address, address of QNE 75 (shown as the last QNE in FIG. 17) is set as the destination address of the nnQNE response packet. This is based on the assumption that nAR 76 is not QNE. In case nAR 76 is QNE, the address of nnQNE is to be obtained logically at the time when the address of nAR 76 has been obtained. However, the same purpose can be attained if this method is applied without the changeover operation as such and nAR 76 grasps that own node corresponds to nnQNE by receiving the nnQNE search packet and performs the processing similar to that of nnQNE 75 as described later.

The nnQNE response packet transmitted from nAR 76 is transmitted from nAR 76 by operation according to the descending pattern C or the descending pattern D as given above. Here, description is given on a case where operation is performed according to an example by setting the address of QNE, which has transferred the nnQNE search packet at the last time, while other patterns may be used.

The nnQNE search packet transmitted from nAR 76 is transferred to QNE 75 and reaches QNE 75 (Step S510). Upon receipt of the nnQNE search packet, QNE 75 grasps that own node is the search object, i.e. nnQNE 75, because the destination address is the address of own node (Step S511). Then, nnQNE 75 generates an nnQNE notifying packet to notify that own node is the search object to pnQNE 73 (or MN 71) (Step S512) and transmits this nnQNE notifying packet (Step S512). Here, it is assumed that the address of pnQNE 73 is set as destination address of the nnQNE notifying packet.

Figure 18:
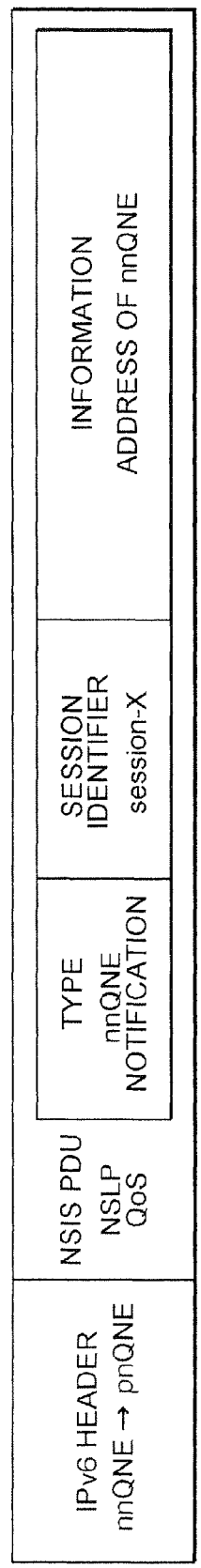
FIG. 18 is a drawing to show an example of packet arrangement of nnQNE notifying packet to be transmitted from nnQNE to pnQNE in the embodiment of the present invention.

The arrangement of the nnQNE notifying packet transmitted from nnQNE 75 to pnQNE 73 is the one shown in FIG. 18, for instance. FIG. 18 is a drawing to show an example of packet arrangement of the nnQNE notifying packet to be transmitted from nnQNE to pnQNE in the embodiment of the present invention. The nnQNE notifying packet shown in FIG. 18 has IPv6 header, which has the address of nnQNE 75 as source address and has the address of pnQNE 73 as destination address. Also, QoS of NSLP is set as PDU of NSIS. As the types of information, information to indicate that address notification of nnQNE is performed, session identifier (session-X) of QoS path, and address of nnQNE 75 are included.

Upon receipt of the nnQNE notifying packet from nnQNE 75, pnQNE 73 transfers the nnQNE notifying packet to MN 71 (Step S514). As a result, the address of nnQNE 75 is notified, and MN 71 can identify QNE, which is present in the vicinity of nAR 76.

Figure 19:
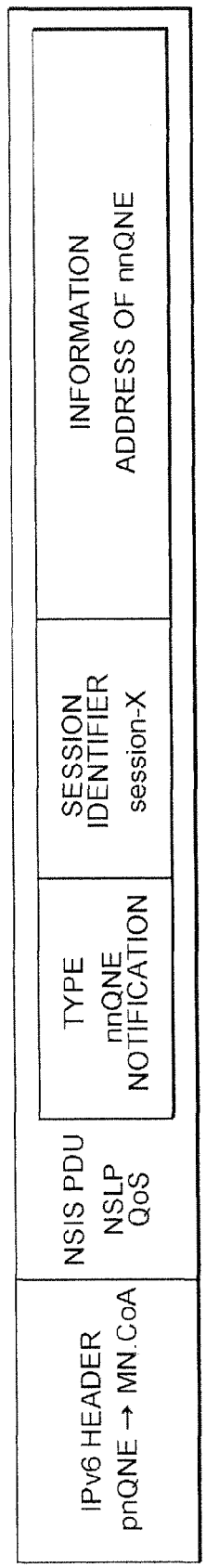
FIG. 19 is a drawing to show an example of packet arrangement of nnQNE notifying packet to be transmitted from pnQNE to MN in the embodiment of the present invention.

The arrangement of the nnQNE notifying packet transmitted from pnQNE 73 to MN 71 is as shown in FIG. 19, for instance. FIG. 19 is a drawing to show an example of packet arrangement of the nnQNE notifying packet to be transmitted from pnQNE to MN in the embodiment of the present invention. The nnQNE notifying packet shown in FIG. 19 has IPv6 header, which has the address of pnQNE 73 as source address and has CoA of MN (MN.CoA) as destination address. The subsequent information is the same as that of the nnQNE notifying packet to be transmitted from nnQNE 75 to pnQNE 73.

On the other hand, when nnQNE 75 grasps that own node is nnQNE 75, it can perform QoS reservation processing for MN 71 by using the data in the nnQNE response packet (Step S516). In this QoS reservation, QoS reservation processing for MN 71 between CN described in nnQNE response packet and nnQNE 75 is carried out.

When the QoS reservation processing has been completed, nnQNE 75 notifies to pnQNE 73 that QoS reservation has been completed (Step S517). For instance, after MN 71 performs the handover from pAR 72 to nAR 76 (Step S515), QoS reservation is performed between MN 71 and nnQNE 75. As a result, QoS reservation between MN 71 and CN via nnQNE 75 is completed (Step S518).

Figure 20:
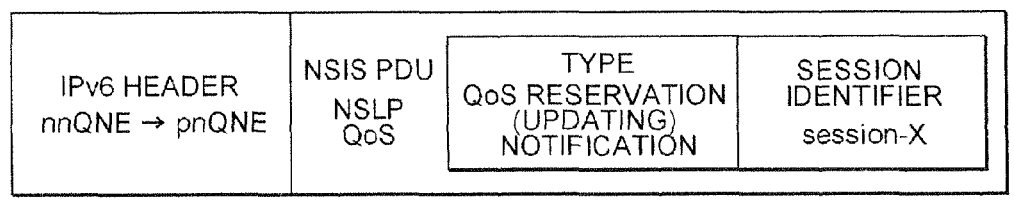
FIG. 20 is a drawing to show a packet arrangement of a QoS reservation completion notifying packet in the embodiment of the present invention.
Figure 21:
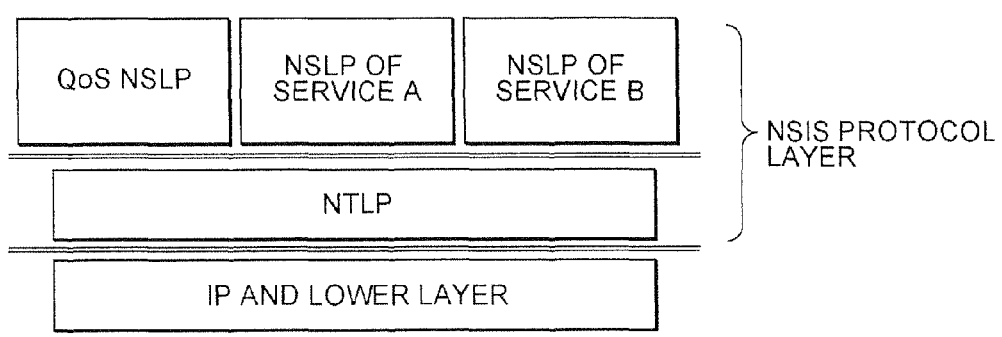
FIG. 21 is a schematical drawing to explain protocol arrangement of NSIS in the prior art.
Figure 22:
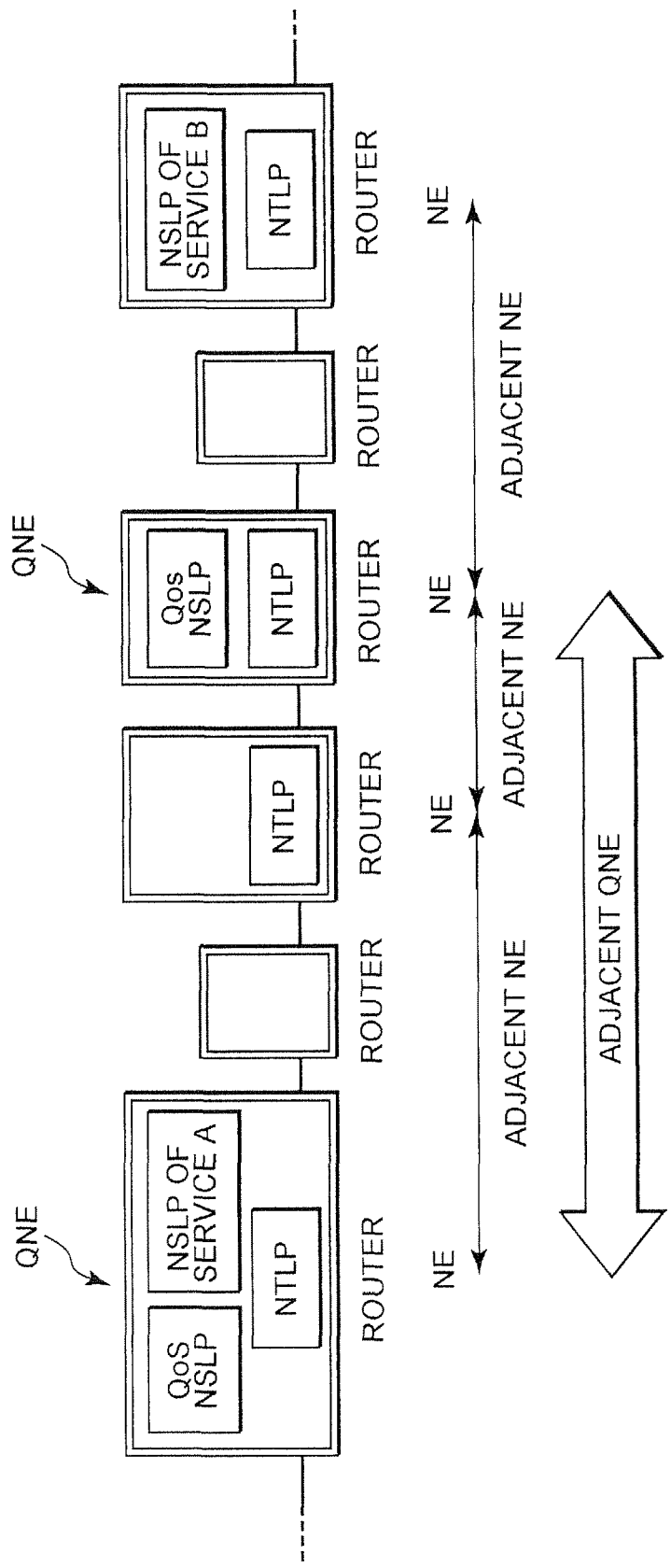
FIG. 22 is a schematical drawing to explain a concept of "neighboring" of NE (i.e. a node of NSIS) or QNE in the prior art.
Figure 23:
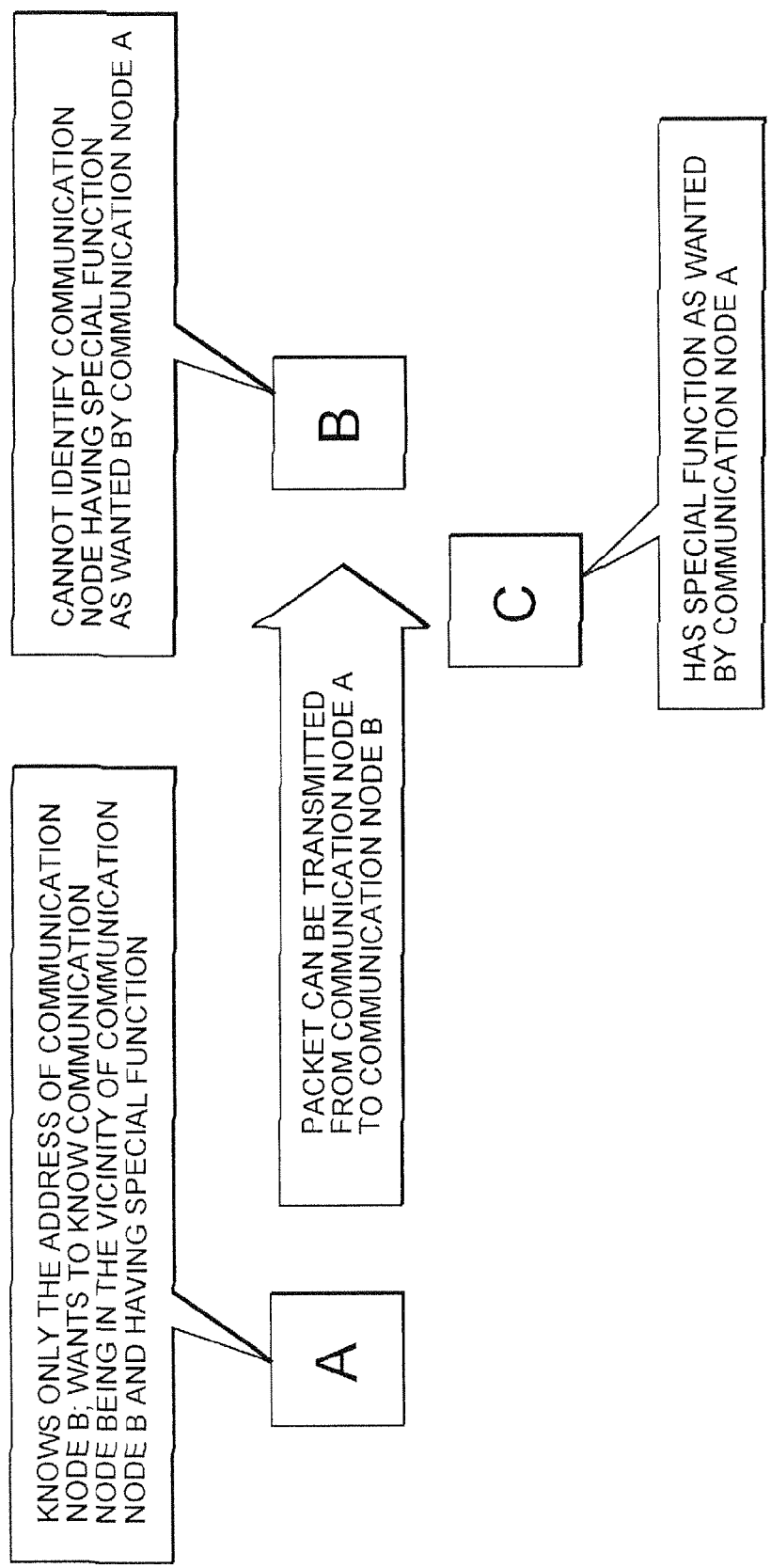
FIG. 23 is a schematical drawing to show positional relationship and status of a communication node to explain problems to be solved by the present invention.
Figure 24:
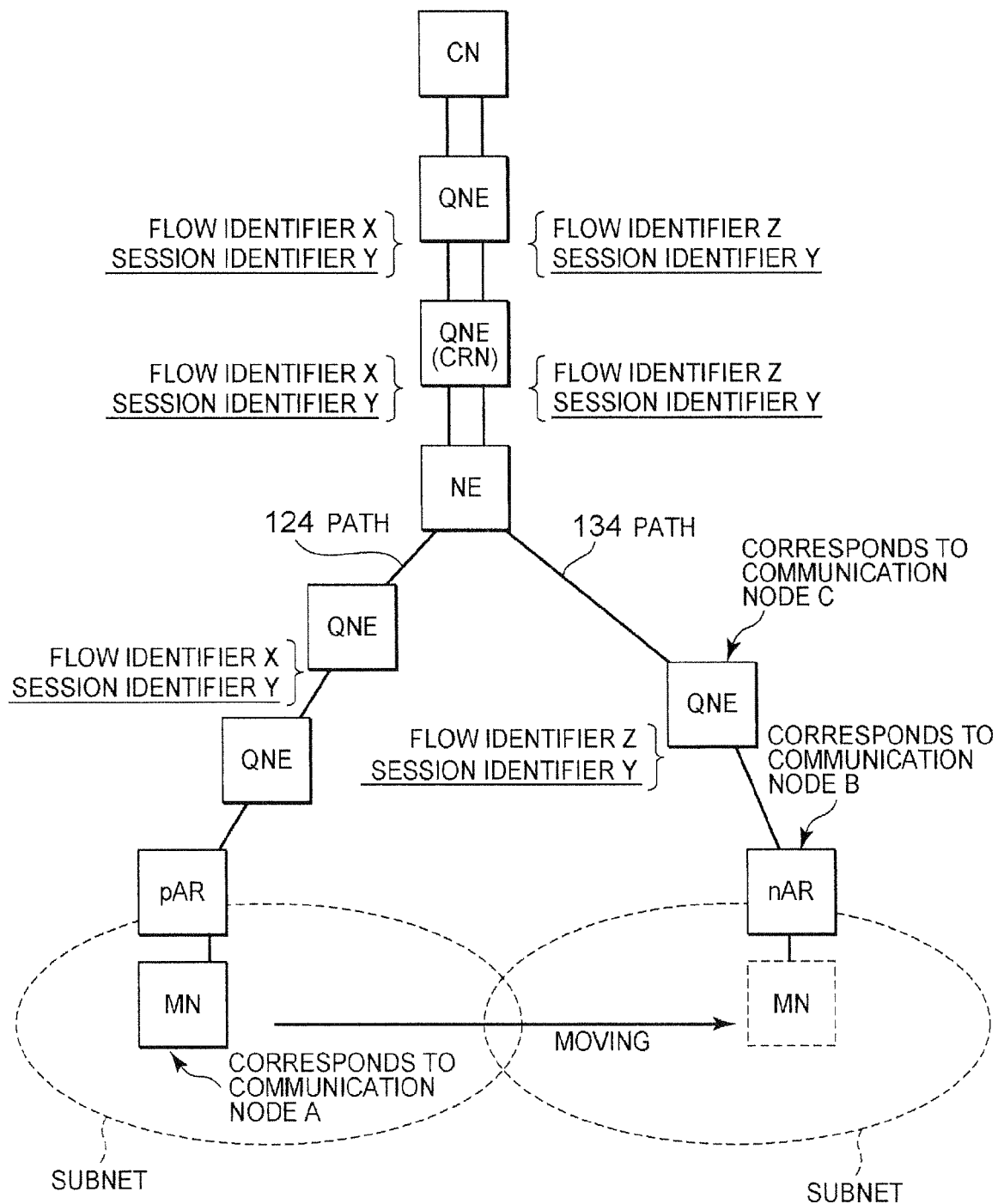
FIG. 24 is a schematical drawing to show a concrete example to explain the problems to be solved by the present invention.

The arrangement of the QoS reservation completion notifying packet transmitted from nnQNE 75 to pnQNE 73 is as shown in FIG. 20, for instance. FIG. 20 is a drawing to show an example of packet arrangement of the QoS reservation completion notifying packet in the embodiment of the present invention. The QoS reservation completion notifying packet shown in FIG. 20 has IPv6 header, which has the address of nnQNE 75 as source address and has the address of pnQNE 73 as destination address. Also, QoS of NSLP is set as PDU of NSIS. Information to indicate the completion of QoS reservation (updating) and session identifier (session-X) of QoS path are included as the types of information.

As described above, under the condition that MN 71 knows address of nAR 76, it is possible to identify nnQNE 75 mounted with NSIS QoS, which is present in the vicinity of nAR 76 not mounted with NSIS QoS. In NSIS, peer-to-peer packet transfer can be performed between QNEs adjacent to each other, and peer-to-peer transfer may be performed between QNEs for the search packet and the response packet as given above. Also, it can be so arranged that QNE other than pnQNE 73 (e.g. QNE 74) can perform processing as the proxy of MN 71 (at the request of MN 71) as QoS reservation requesting packet is transferred by NSIS from pnQNE 73 to another QNE (QNE closer to nAR 76).

In these cases, the packet is to be transferred by NSIS. This is useful, for instance, when the packet cannot be delivered due to security reason (in case the transfer of the echo request packet and the echo response packet of ICMPv6 is allowed between the neighboring nodes but the transfer to a different network is not allowed).

Each of the functional blocks used in the description of the embodiment of the present invention can be realized as LSI (Large Scale Integration), of which a typical example is an integrated circuit. These may be produced as one chip individually or may be produced to include a part or all as one chip. Here, it is described as LSI, while it may be referred as IC (Integrated Circuit), system LSI, super LSI or ultra-LSI, depending on the difference of integration.

The procedure to produce the integrated circuit is not limited to that of LSI, and it may produced as special-purpose circuit or general-purpose processor. After the manufacture of LSI, FPGA (Field Programmable Gate Array), which can be programmed, or reconfigurable processor, in which connection or setting of circuit cells inside LSI can be reconfigured, may be used.

Further, if a new technique of integrated circuit, which is to replace LSI, may emerge with the progress of semiconductor technique or other type of technique derived from it, the functional blocks may be integrated by using such techniques. For example, one of the possibilities may be found in the adaptation of biotechnology.

INDUSTRIAL APPLICABILITY

The present invention provides such effects that a communication node having special function can be identified under the condition that a certain communication node knows only the address of a communication node having no special function, and this can be applied in the communication technique to perform packet communication by using IPv6 or in the technique to update QoS path in the communication using mobile IPv6.

The invention claimed is:

1. A communication system, comprising:
at least a first communication node, having a first function to realize transfer of a packet, and a second function, being an additional function different from said first function, and
a second communication node having said first function, and said first communication node grasps address of said second communication node, wherein:
said first communication node transmits a search packet to said second communication node for the purpose of searching a communication node having said first function and said second function; and
said second communication node transmits a response packet including predetermined information in response to the receiving of said search packet; and
a third communication node, having said first function and said second function and being a first receiver of said response packet, grasps that it is a search object of said first communication node upon receipt of said response packet, wherein:
said search packet is transferred without modifying the packet from said first communication node to said second communication node, and after said second communication has received said search packet transmitted from said first communication node as it is, it is arranged that said response packet is transmitted, which has source address of said search packet as destination address.

2. The communication system according to claim 1, wherein said third communication node discards said response packet and generates and transmits a notifying packet including address of said third communication node to said destination address of said response packet.

3. The communication system according to claim 1, wherein said third communication node inserts address of said third communication node into said response packet and transmits said response packet.

4. The communication system according to claim 3, wherein the communication node having said first function and said second function to transfer said response packet transfers the response packet as it is without modifying the packet when said response packet with the address of said third communication node inserted therein is received.

5. A communication system, comprising:
at least a first communication node, having a first function to realize transfer of a packet, and a second function, being an additional function different from said first function, and
a second communication node having said first function, and said first communication node grasps address of said second communication node, wherein:
said first communication node transmits a search packet to said second communication node for the purpose of searching a communication node having said first function and said second function; and
said second communication node transmits a response packet including predetermined information in response to the receiving of said search packet; and
a third communication node, having said first function and said second function and being a first receiver of said response packet, grasps that it is a search object of said first communication node upon receipt of said response packet, wherein:
the communication node having said first function and said second function, which transfers said search packet from said first communication node to said second communication node, is arranged to transfer by rewriting source address of said search packet to address of own communication node, said second communication node has address of said communication node, having said first function and said second function as rewritten immediately before reaching said second communication node, as a source address, and after said search packet having address of said first communication node in a predetermined region has been received, the source address of said search packet is transmitted, which has source address of said search packet as destination address.

6. The communication system according to claim 5, wherein said third communication node has the address of said first communication node included in said response packet as destination address, and generates and transmits a notifying packet including address of said third communication node.

7. A communication system, comprising:
at least a first communication node, having a first function to realize transfer of a packet, and a second function, being an additional function different from said first function, and
a second communication node having said first function, and said first communication node grasps address of said second communication node, wherein:
said first communication node transmits a search packet to said second communication node for the purpose of searching a communication node having said first function and said second function; and
said second communication node transmits a response packet including predetermined information in response to the receiving of said search packet; and
a third communication node, having said first function and said second function and being a first receiver of said response packet, grasps that it is a search object of said first communication node upon receipt of said response packet, wherein:
said first communication node inserts desired information into payload of said search packet, and said second communication node includes said desired information in the payload of said search packet into the payload of said response packet without changing so that said desired information is offered from said first communication node transmitting said search packet to said third communication node, which receives said response packet.

8. A communication system, comprising:
at least a first communication node, having a first function to realize transfer of a packet, and a second function, being an additional function different from said first function, and
a second communication node having said first function, and said first communication node grasps address of said second communication node, wherein:
said first communication node transmits a search packet to said second communication node for the purpose of sea chin a communication node having said first function and said second function; and
said second communication node transmits a response packet including predetermined information in response to the receiving of said search packet; and
a third communication node, having said first function and said second function and being a first receiver of said response packet, grasps that it is a search object of said first communication node upon receipt of said response packet, wherein:
a movable mobile node transmits a search request of a communication node having said first function and said second function including at least the address of said second communication node to said first communication node, and said first communication node generates and transmits said search packet upon receipt of said search request.

9. A communication system, comprising:
at least a first communication node, having a first function to realize transfer of a packet, and a second function, being an additional function different from said first function, and
a second communication node having said first function, and said first communication node grasps address of said second communication node, wherein:
said first communication node transmits a search packet to said second communication node for the purpose of searching a communication node having said first function and said second function; and
said second communication node transmits a response packet including predetermined information in response to the receiving of said search packet; and
a third communication node, having said first function and said second function and being a first receiver of said response packet, grasps that it is a search object of said first communication node upon receipt of said response packet, wherein:

said first function is realized by the mounting of IPv6 and ICMPv6, and said search packet and said response packet are an echo request packet and an echo response packet of ICMPv6 respectively.

10. A communication system, comprising:
at least a first communication node, having a first function to realize transfer of a packet, and a second function, being an additional function different from said first function, and
a second communication node having said first function, and said first communication node grasps address of said second communication node, wherein:
said first communication node transmits a search packet to said second communication node for the purpose of searching a communication node having said first function and said second function; and
said second communication node transmits a response packet including predetermined information in response to the receiving of said search packet; and
a third communication node, having said first function and said second function and being a first receiver of said response packet, grasps that it is a search object of said first communication node upon receipt of said response packet, wherein:
said second function is realized by the mounting of NSIS, and a communication node mounted with NSIS and being the first receiver of said response packet to be transmitted from said second communication node is searched by said first communication node.

11. A communication node having a first function to realize transfer of packet and having a second function being an additional function different from said first function, wherein said communication node comprises:
an address grasping unit configured to grasp an address of a predetermined communication node having said first function;
a searching unit configured to generate and transmit a search packet having the address of said predetermined communication node as destination address with the purpose of searching another communication node having said first function and said second function; and
an address acquiring unit configured to acquire an address of said another communication node having said first function and said second function by one of:
(i) receiving a notifying packet containing the address of said another communication node having said first function and said second function, said another communication node being the first receiver of a response packet transmitted as a response to said search packet by said predetermined communication node, or
(ii) receiving said response packet containing the address of said another communication node having said first function and said second function, said another communication node being the first receiver of said response packet.

12. The communication node according to claim 11, wherein said searching unit is configured to insert desired information into payload of said search packet so that said predetermined communication node offers said desired information included in payload of said response packet to said another communication node having said first function and said second function, said another communication node being a first receiver of said response packet, and said desired information being the information contained in payload of said search packet as it is.

13. The communication node according to claim 11, wherein said communication node comprises a search request receiving unit configured to receive a search request of a communication node having said first function and said second function at least including address of said predetermined communication node from a movable mobile node, and for generating and transmitting said search packet based on the receiving of said search request.

14. A communication node having a first function to realize transfer of packet and having a second function being an additional function different from said first function, wherein said communication node comprises:
a packet transfer unit configured to transfer a packet;
a search packet detecting unit configured to detect a search packet transmitted from a first communication node to a second communication node with the purpose for searching a communication node having said first function and said second function; and
a packet modifying unit configured to rewrite source address of said search packet to address of own communication node when said search packet has been detected by said search packet detecting in unit.

15. The communication node according to claim 14, wherein said first function is fulfilled by the mounting of IPv6 and ICMPv6, and said search packet and said response packet are arranged to be an echo request packet and an echo response packet of ICMPv6 respectively.

16. The communication node according to claim 14, wherein said second function is fulfilled by the mounting of NSIS, and a communication node is searched, which is mounted with NSIS and is the first receiver of said response packet transmitted from said predetermined communication node.

17. A communication node having a first function to realize transfer of packet and having a second function being an additional function different from said first function, wherein said communication node comprises:
a packet transfer unit configured to transfer a packet; and
a response packet detecting unit configured to grasp that own communication node is a search object of said first communication node by detecting a response packet to the search packet, said search packet being transmitted from a first communication node to a second communication node with the purpose of searching a communication node having said first function and said second function, wherein:
said communication node comprises an address notifying means unit configured to generate and notify a notifying packet having address of said first communication node contained in said response packet as destination address and including address of own communication node.

18. The communication node according to claim 17, wherein said communication node comprises a response packet discarding unit configured to discard said response packet.

19. A communication node having a first function to realize transfer of packet and having a second function being an additional function different from said first function, wherein said communication node comprises:
a packet transfer unit configured to transfer a packet; and
a response packet detecting unit configured to grasp that own communication node is a search object of said first communication node by detecting a response packet to the search packet, said search packet being transmitted from a first communication node to a second communication node with the purpose of searching a communication node having said first function and said second function, wherein:
said communication node comprises:
an address insertion detecting unit configured to detect whether or not address of another communication node having said first function and said second function is inserted in a predetermined region in said response packet;

an address inserting unit configured to insert address of own communication node in a predetermined region in said response packet when it has been detected at said address insertion detecting unit that address of said another communication node is not inserted; and said response packet where address of said another communication node is inserted is transferred when it is detected that address of said another communication node is not inserted at said address insertion detecting unit, and said response packet is transferred without modifying the packet when it is detected that address of said another communication node is inserted at said address insertion detecting unit.

20. A communication node having a first function to realize transfer of packet and having a second function being an additional function different from said first function, wherein said communication node comprises:

a packet transfer unit configured to transfer a packet; and a response packet detecting unit configured to grasp that own communication node is a search object of said first communication node by detecting a response packet to the search packet, said search packet being transmitted from a first communication node to a second communication node with the purpose of searching a communication node having said first function and said second function, wherein:

said first function is fulfilled by the mounting of IPv6 and ICMPv6, and said search packet and said response packet are arranged to be an echo request packet and an echo response packet of ICMPv6 respectively.

21. A communication node having a first function to realize transfer of packet and having a second function being an additional function different from said first function, wherein said communication node comprises:

a packet transfer unit configured to transfer a packet; and a response packet detecting unit configured to grasp that own communication node is a search object of said first communication node by detecting search packet, said search packet being transmitted from a first communication node to a second communication node with the purpose of searching a communication node having said first function and said second function, wherein:

said second function is fulfilled by the mounting of NSIS, and a communication node is searched, which is mounted with NSIS and is the first receiver of said response packet transmitted from said predetermined communication node.

* * * * *